United States Patent
Nakayama et al.

(10) Patent No.: US 11,702,574 B2
(45) Date of Patent: Jul. 18, 2023

(54) ADHESIVE SILICONE COMPOSITION AND AN ADHESIVE FILM OR TAPE

(71) Applicant: Shin-Etsu Chemical Co., Ltd., Tokyo (JP)

(72) Inventors: Ken Nakayama, Gunma (JP); Yasuyoshi Kuroda, Gunma (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 495 days.

(21) Appl. No.: 16/961,371

(22) PCT Filed: Jan. 15, 2019

(86) PCT No.: PCT/JP2019/000909
§ 371 (c)(1),
(2) Date: Jul. 10, 2020

(87) PCT Pub. No.: WO2019/142779
PCT Pub. Date: Jul. 25, 2019

(65) Prior Publication Data
US 2020/0347281 A1 Nov. 5, 2020

(30) Foreign Application Priority Data
Jan. 16, 2018 (JP) ................. 2018-004825

(51) Int. Cl.
| | | |
|---|---|---|
| C09J 183/06 | (2006.01) | |
| C08K 3/011 | (2018.01) | |
| C08K 3/11 | (2018.01) | |
| C09J 7/22 | (2018.01) | |
| C09J 7/38 | (2018.01) | |
| C08G 77/08 | (2006.01) | |
| C08G 77/12 | (2006.01) | |

(52) U.S. Cl.
CPC ............ *C09J 183/06* (2013.01); *C08G 77/08* (2013.01); *C08G 77/12* (2013.01); *C08K 3/011* (2018.01); *C08K 3/11* (2018.01); *C09J 7/22* (2018.01); *C09J 7/38* (2018.01); *C08G 2170/40* (2013.01); *C09J 2301/408* (2020.08)

(58) Field of Classification Search
CPC ......... C08L 83/04; C09J 183/00; B01J 23/42; B01J 23/44
See application file for complete search history.

(56) References Cited

U.S. PATENT DOCUMENTS

| | | |
|---|---|---|
| 2011/0111217 A1 | 5/2011 | Kuroda et al. |
| 2012/0232219 A1 | 9/2012 | Kato et al. |
| 2012/0240141 A1 | 9/2012 | Sim et al. |
| 2015/0240141 A1 | 8/2015 | Tsuchida |
| 2016/0280918 A1 | 9/2016 | Kumar et al. |
| 2019/0106571 A1* | 4/2019 | Nakagawa .......... G02B 1/04 |

FOREIGN PATENT DOCUMENTS

| | | |
|---|---|---|
| CN | 102675884 A | 9/2012 |
| CN | 104877622 A | 9/2015 |
| CN | 105814142 A | 7/2016 |
| CN | 106103629 A | 11/2016 |
| EP | 2497802 A1 | 9/2012 |
| EP | 2913374 A1 | 9/2015 |
| JP | 06-39584 | 5/1994 |
| JP | 2004-307653 | 11/2004 |
| JP | 2010116324 A | 5/2010 |
| JP | 2011-102336 A | 5/2011 |
| JP | 2012-149240 | 8/2012 |
| JP | 2012184350 A | 9/2012 |
| JP | 2013-060493 A | 4/2013 |
| JP | 2013-112686 | 6/2013 |
| JP | 2014047310 A | 3/2014 |
| JP | 2015-074741 | 4/2015 |
| JP | 2015-178584 A | 10/2015 |
| KR | 1020150101937 A | 9/2015 |
| KR | 1020160099542 A | 8/2016 |
| KR | 1020170101937 A | 9/2017 |
| WO | 2012091167 A2 | 7/2012 |
| WO | 2015093283 A1 | 6/2015 |
| WO | 2015/194389 | 12/2015 |
| WO | 2017164265 * | 9/2017 |

OTHER PUBLICATIONS

International Search Report for Japanese Application No. PCT/JP2019/000909 dated Apr. 2, 2019.

* cited by examiner

*Primary Examiner* — Kuo Liang Peng
(74) *Attorney, Agent, or Firm* — Rimon, P.C.

(57) ABSTRACT

An adhesive silicone composition having (A) a linear or branched organopolysiloxane having at least two alkenyl groups in a molecule (B) an organopolysiloxane comprising $R^2_3SiO_{1/2}$ units and $SiO_{4/2}$ units, wherein $R^2$ is, independently of each other, a substituted or unsubstituted, monovalent hydrocarbon group having 1 to 10 carbon atoms, (C) an organohydrogenpolysiloxane having at least three hydrogen atoms each bonded to a silicon atom in a molecule and having no aryl group, and (E) an organohydrogenpolysiloxane having at least three hydrogen atoms each bonded to a silicon atom in a molecule and having an aryl group-containing organic group.

13 Claims, No Drawings

ADHESIVE SILICONE COMPOSITION AND AN ADHESIVE FILM OR TAPE

CROSS REFERENCE TO RELATED APPLICATIONS

The present application is a National Stage application of and claims priority to PCT application PCT/JP2019/000909 filed Jan. 15, 2019 which claims priority to Japanese Application No. 2018-004825 filed Jan. 16, 2018, the contents of the above application are incorporated by reference herein in their entireties.

TECHNICAL FIELD

The present invention relates to an adhesive silicone composition having excellent adherence to a base material and showing less increase in adhesion strength with time, and an adhesive film or tape comprising a cured layer of the adhesive composition. The adhesive film or tape is suitable to be attached to touch panels or to be attached to optical members, such as optical films, or electronic components, such as printed wiring boards, for protecting or masking them in a step of processing them. Hereinafter, adherence of a cured layer of an adhesive silicone composition to a base such as a tape or film is sometimes referred to simply as adherence of an adhesive silicone composition.

BACKGROUND OF THE INVENTION

A main skeleton of polysiloxane constituting a silicone adhesive is composed of Si—O bonds which have high bond energy. Therefore, the polysiloxane has excellent heat resistance, cold resistance, weather resistance, an electric insulating property, and chemical resistance.

In addition, a silicone adhesive exhibits excellent wettability to various adherends, and adheres to silicone resins, polyolefins, fluororesins, silicone rubber, and silicone release paper to all of which organic resin-based adhesives, such as acrylic or rubber-based adhesives, adhere poorly.

In order to produce an adhesive tape with a silicone adhesive, a silicone adhesive is applied on a base material such as a plastic film and cured to increase adhesion.

Applications of an adhesive tape include heat-resistant adhesive tapes, heat-resistant masking tapes, chemical-resistant masking tapes, electrically insulating tapes, tapes for fixing silicone rubber, and splicing tapes for connecting two piece of silicone release paper, which adhesive tape is manufactured by coating a heat-resistant base material with a silicone adhesive.

In recent years, demand for silicone adhesives has been expanding on account of the growth of the market of products comprising a touch panel, such as smartphones and tablet terminals. A touch panels is usually touched directly with the fingers of a person, so that a screen-protecting film is affixed to a display to protect the display from becoming dirty or scratched. An adhesive layer of the screen-protecting film is mostly a silicone adhesive. This is because the silicone adhesive has good wettability to an adherend and a good rework property.

A base material used in screen-protecting films is made of a plastic, mostly a film of polyester such as PET having good transparency. However, the plastic film is known to have lower adherence by an adhesive, compared to a paper base material. This is considered to be due to the fact that the plastic film has a flat surface, so that an effect of anchoring of the adhesive into the plastic base material is week, compared to a paper base material having large surface unevenness. If the adherence is low, the adhesive layer may transfer to an opposing surface of the plastic film in a rolled screen-protecting film product, or the adhesive layer may remain on an adherend when the screen-protecting film product is peeled off from the adherend after a considerable time from the application.

Previously, various measures have been taken to improve adherence, such as using a base material offering good adherence or corona treatment on a base material. In addition, a primer treatment is also widely conducted, and primer compositions for a silicone adhesive have been developed (see Patent Literatures 1 to 4) Although the primer treatment is very effective to improve adherence, a further step of coating is added so as to raise problems on the costs and productivity.

Another effective countermeasure is to add a component of improving adhesion to a silicone adhesive to ensure good adherence in one coating step.

Patent Literature 5 describes an adhesive silicone composition comprising an adherence improver having an epoxy group, a hydroxyl group, an alkenyl group or an alkoxy group in a specific ratio, which adhesive composition has good adherence to a base material over a moist heat period.

Patent Literatures 6 and 7 describe that adhesion to a base material of an adhesive silicone composition is improved by incorporating an adherence improver of a specific structure having an aryl group and an SiH group.

Patent Literature 8 describes that adherence of an adhesive silicone composition to a film base material is improved by use of a base polymer having a phenyl group in a specific ratio.

PRIOR ART LITERATURES

Patent Literatures

[Patent Literature 1] Japanese Examined Patent Publication No. Hei 6-39584
[Patent Literature 2] Japanese Patent Application Laid-Open No. 2004-307653
[Patent Literature 3] Japanese Patent Application Laid-Open No. 2012-149240
[Patent Literature 4] Japanese Patent Application Laid-Open No. 2013-112686
[Patent Literature 5] Japanese Patent Application Laid-Open No. 2015-074741
[Patent Literature 6] WO2015-194389
[Patent Literature 7] Japanese Patent Application Laid-Open No. 2015-178584
[Patent Literature 8] Japanese Patent Application Laid-Open No. 2011-102336

SUMMARY OF THE INVENTION

Problems to be Solved by the Invention

The adherence-improving agents described in Patent Literatures 5 to 7 improve the adherence of the adhesive silicone composition over a moist heat period. However, these literatures do not refer to adherence over time at room temperature. These adherence-improving agents have a problem to increase an adhesion strength with time.

The adhesive silicone composition described in Patent Literature 8 has insufficient adherence to a polyethylene terephtalate film. Patent Literature 8 does not refer to adherence of the adhesive silicone composition over time at room temperature.

In order to improve the adherence between an adhesive layer and a base material, it is necessary to incorporate, into an adhesive composition, a functional compound which interacts with the base material. However, such a functional compound may interact also with an adherend. Then, the adhesion strength becomes higher with time, which is problematic.

The present invention has been made under the aforementioned circumstances. A purpose of the present invention to provide an adhesive silicone composition which provides, in one coating step, an adhesive layer having excellent adherence to a base material and showing a small increase in adhesion strength with time, and also provide an adhesive film or tape comprising an adhesive layer formed by curing the adhesive silicone composition.

Means to Solve the Problems

As a result of the extensive research to achieve the aforementioned purpose, the present inventors have found that the aforesaid purpose is achieved by incorporating, into a composition of an addition-curable adhesive silicone, a specific amount of an organohydrogenpolysiloxane having at least three hydrogen atoms each bonded to a silicon atom in a molecule and having an aryl group-containing organic group wherein a ratio of the number of the aryl group-containing organic group each bonded to a silicon atom to a total of the number of the hydrogen atoms each bonded to a silicon atom and the number of the groups each bonded to a silicon atom is 0.05 to 0.40.

In the present invention, the aryl group-containing organic group means an aryl group bonded to a silicon atom and an aralkyl group bonded to a silicon atom.

That is, the present invention provides an adhesive silicone composition comprising the following components (A) through (E):

(A) a linear or branched organopolysiloxane having at least two alkenyl groups in a molecule in an alkenyl group content of at least 0.0005 mol/100 g and less than 0.15 mol/100 g, in an amount of 40 to 100 parts by mass, (B) an organopolysiloxane comprising $R^2{}_3SiO_{1/2}$ units and $SiO_{4/2}$ units, wherein $R^2$ is, independently of each other, a substituted or unsubstituted, monovalent hydrocarbon group having 1 to 10 carbon atoms, having a mole ratio of the $R^2{}_3SiO_{1/2}$ units to the $SiO_{4/2}$ units being 0.5 to 1.5, and optionally having a hydroxyl or alkoxy group bonded to a silicon atom, in an amount of 60 to 0 parts by mass, provided that a total amount of components (A) and (B) is 100 parts by mass, (C) an organohydrogenpolysiloxane having at least three hydrogen atoms each bonded to a silicon atom in a molecule and having no aryl group, in such an amount that a ratio of the number of the SiH groups in component (C) to the number of the alkenyl groups in component (A) is 0.5 to 15, (D) platinum group metal catalyst in a catalytic amount, and (E) an organohydrogenpolysiloxane having at least three hydrogen atoms each bonded to a silicon atom in a molecule and having an aryl group-containing organic group, wherein a ratio of the number of the aryl group-containing organic group each bonded to a silicon atom to a total of the number of the hydrogen atoms each bonded to a silicon atom and the number of the groups each bonded to a silicon atom is 0.05 to 0.40, in an amount of 0.01 to 10 parts by mass per total 100 parts by mass of component (A) and component (B), provided that a ratio of the number of the SiH groups in component (E) to the number of the alkenyl groups in component (A) is 0.1 to 15.

Further, the present invention provides a cured product obtained by curing the aforesaid adhesive silicone composition, and an adhesive film or tape comprising the cured product, i.e., adhesive layer.

Effects of the Invention

The cured product obtained by curing the addition-curable adhesive silicone composition of the present invention shows good adherence to a base material in one coating step, and shows small increase in adhesion strength with time. Therefore, it is possible to provide an adhesive film or tape having excellent stability.

Hereinafter, adherence of a cured layer of an adhesive silicone composition to a base such as a tape or film is sometimes referred to simply as adherence of an adhesive silicone composition.

EMBODIMENTS FOR PRACTICING THE INVENTION

Hereinafter, the adhesive silicone composition of the present invention will be described in more detail.

Component (A)

Component (A) is a linear or branched organopolysiloxane having at least two alkenyl groups in a molecule in an alkenyl group content of at least 0.0005 mol/100 g and less than 0.15 mol/100 g. Component (A) is preferably represented by the following formula (1)

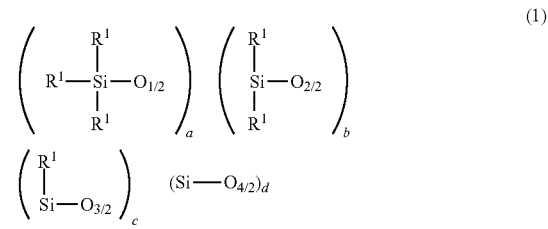

wherein $R^1$ is, independently of each other, a hydroxyl group or a substituted or unsubstituted, monovalent hydrocarbon group having 1 to 10 carbon atoms, provided that at least two of $R^1$ are an alkenyl group-containing hydrocarbon group having 2 to 10 carbon atoms, a is an integer of 2 or more, b is an integer of 1 or more, c is an integer of 0 or more, d is an integer of 0 or more, and $100 \leq a+b+c+d \leq 20,000$.

Component (A) may be alone or in combination thereof.

In Formula (1), $R^1$ is, independently of each other, a hydroxyl group or a monovalent hydrocarbon group having 1 to 10 carbon atoms, and at least two of $R^1$ are an alkenyl-containing hydrocarbon group having 2 to 10 carbon atoms. The alkenyl group-containing hydrocarbon group has 2 to 10 carbon atoms, preferably 2 to 8 carbon atoms. Examples thereof include an alkenyl group such as a vinyl group, an allyl group, a hexenyl group, and an octenyl group; and a cycloalkenylalkyl group such as a cyclohexenylethyl group. Examples of the alkenyl group-containing monovalent hydrocarbon group include an acryloylalkyl group and a methacryloylalkyl group, such as an acryloylpropyl group, an acryloylmethyl group and a methacryloylpropyl group. It may have an ether linkage in the methylene chain such as, for instance, —(CH$_2$)$_2$O—CH$_2$—CH=CH$_2$, and —(CH$_2$)$_3$O—CH$_2$—CH=CH$_2$.

The monovalent hydrocarbon group which does not have an alkenyl group is a monovalent hydrocarbon group having 1 to 10 carbon atoms and having no aliphatic unsaturated bond, and is preferably an alkyl group having 1 to 6 carbon atoms, such as a methyl group, an ethyl group, a propyl group, and a butyl group; a cycloalkyl group having 5 to 8 carbon atoms, such as a cyclohexyl group; an aryl group having 6 to 10 carbon atoms, such as a phenyl group and a tolyl group; an aralkyl group having 7 to 10 carbon atoms, such as a benzyl group; and these in which a part or all of the hydrogen atoms each bonded to a carbon atom is substituted with a hydroxy group, a cyano group, a halogen atom, an alkoxysilyl group, a polyoxyalkylene group, an epoxy group or a carboxyl group. Among them, a methyl group and a phenyl group are preferred, and a methyl group is particularly preferred. Where $R^1$ includes an aryl group-containing hydrocarbon group as defined below, a ratio of the number of the aryl group-containing hydrocarbon groups to the total number of the groups bonded to the silicon atoms of the organopolysiloxane (i.e., $R^1$ in equation (1)) is preferably 0.001-0.30. If the ratio is larger than 0.3, adherence of the cured adhesive silicone layer may decrease. The aryl group-containing hydrocarbon group means an aryl group bonded to a silicon atom, and an aralkyl group bonded to a silicon atom.

In formula (1), a is an integer of 2 or more, preferably 2 to 3,000, b is an integer of 1 or more, preferably 100 to 14,500, c is an integer of 0 or more, preferably 0 to 1,000, d is an integer of 0 or more, preferably 0 to 1,000, and 100≤a+b+c+d≤20,000, preferably 150≤a+b+c+d≤15,000. If the total number of the siloxane units, (a+b+c+d), is smaller than the lower limit, the reactivity may be poor or uniform coating is difficult. If the total number exceeds the upper limit, the viscosity of the composition is very high to make mixing difficult and to thereby lower the workability.

The amount of the alkenyl groups in component (A) is preferably 0.0005 mol or more and less than 0.15 mol, more preferably 0.0006 to 0.13 mol/100 g of component (A), more preferably 0.008 to 0.10 mol/100 g, per 100 g. If the amount is less than the lower limit, curable may be poor. When the amount is less than the upper limit the obtained adhesive layer does not become hard, so that an appropriate adhesion strength and appropriate adherence are obtained. The amount of the alkenyl group may be determined usually by a known method such as an iodination method (Hanus method) or an NMR.

Component (A) may have a hydroxyl group bonded to a silicon atom (SiOH group). An amount of the hydroxyl group is preferably 0.01 to 0.45% by mass, particularly 0.03 to 0.4% by mass, based on the mass of component (A). By having a hydroxyl group, component (A) may cause a hydrolytic condensation reaction with composition (B).

The adhesive silicone composition of the present invention may further comprise (A') a linear or branched organopolysiloxane having no alkenyl group or SiH group, but having an SiOH group. Organopolysiloxane (A') preferably causes a hydrolytic condensation reaction with component (B). An amount of organopolysiloxane (A') having no alkenyl group is not particularly limited, as long as the characteristics of the present invention are not impaired, and is preferably 0 to 75% by mass, more preferably 0 to 60% by mass, based on a total mass of components (A) and (A'). Organopolysiloxane (A') is represented, for instance, by the following formula (1').

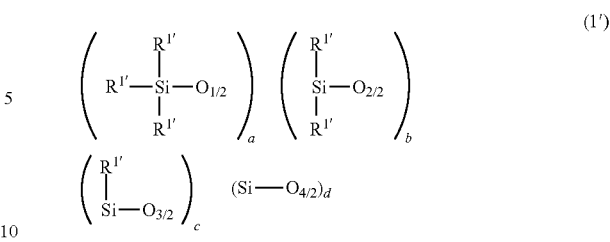

wherein $R^{1'}$ is, independently of each other, a hydroxyl group or a substituted or unsubstituted, monovalent hydrocarbon group having 1 to 10 carbon atoms and no alkenyl group, provided that at least one of $R^{1'}$ is a hydroxyl group, a is an integer of 2 or more, b is an integer of 1 or more, c is an integer of 0 or more, d is an integer of 0 or more, and 100≤a+b+c+d≤20,000.

Component (A) and Component (A') may be in a state of oil or raw rubber. The oily one preferably has a viscosity of 1,000 to 1,000,000 mPa·s, particularly 5,000 to 800,000 mPa·s, at 25 degrees C. For the raw rubber-like one, a 30% by mass solution thereof in toluene preferably has a viscosity of 1,000 to 200,000 mPa·s, particularly 3,000 to 100,000 mPa·s. If the viscosity is less than the lower limit, the curability of the adhesive composition may be poor, or uniform coating may be difficult. If the viscosity exceeds the upper limit, the adhesive composition is too much viscous to make mixing difficult in the preparation of the composition.

Component (A) and Component (A') may be linear or branched, but preferably linear.

Preferably, component (A) is diorganopolysiloxane represented by the following formula (3) or (4).

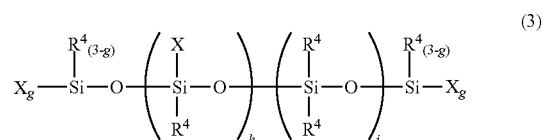

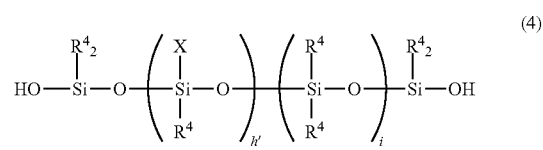

wherein $R^4$ is, independently of each other, a substituted or unsubstituted, monovalent hydrocarbon group having 1 to 10 carbon atoms and no alkenyl group, X is an alkenyl group-containing monovalent hydrocarbon group having 2 to 10 carbon atoms, g is an integer of 0 to 3, h is an integer of 0 or more, h' is an integer of 2 or more, i is an integer of 100 or more, 2 g+h≥2, 102≤h+i+2≤20,000, and 104≤h'+i+2≤20,000.

Examples of $R^4$ include the monovalent hydrocarbon group having no alkenyl group, as described above. Among them, a methyl group and a phenyl group are preferred, and a methyl group is particularly preferred.

X is an alkenyl group-containing monovalent hydrocarbon group having 2 to 10 carbon atoms, preferably 2 to 8 carbon atoms, and may contain an oxygen atom. The particulars are as mentioned on the alkenyl group-containing monovalent hydrocarbon group for $R^1$.

In formulas (3) and (4), g is an integer of 0 to 3, preferably 0 or 1, h is an integer of 0 or more, preferably an integer of 0 to 3,000, h' is an integer of 2 or more, preferably an integer of 2 to 3,000, i is an integer of 100 or more, preferably 150 to 14,500, and 2 g+h≥2, preferably, 2≤2 g+h≤3000, 102≤h+i+2≤20,000, preferably, 150≤h+i≤15,000, and 104≤h'+i+2≤20,000, preferably, 150≤h'+i≤15,000.

Examples of component (A) include, but are not limited to, the following. Here, Me, Vi, and Ph represent a methyl group, a vinyl group, and a phenyl group, respectively. The order of the siloxane units in parentheses is not limited and may be at random or in block. In each of the following formulas, the total number of the repeating siloxane units is on average.

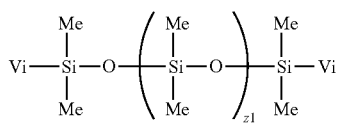

wherein 100≤z1≤5,000.

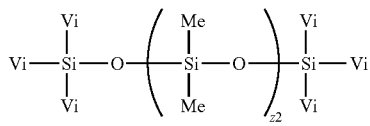

wherein 100≤z2≤15,000.

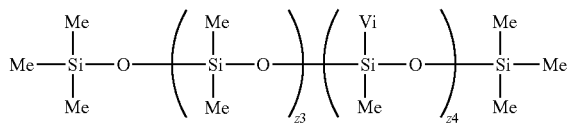

wherein 100≤z3≤19,000, 2≤z4≤2,000, 102≤z3+z4≤20,000.

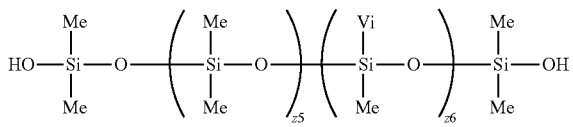

wherein 100≤z5≤19,000, 2≤z6≤2,000, 102≤z5+z6≤20,000.

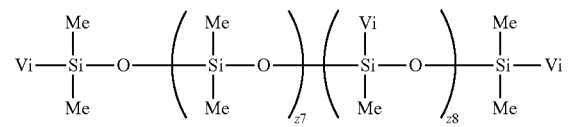

wherein 100≤z7≤19,000, 1≤z8≤2,000, 101≤z7+z8≤20,000.

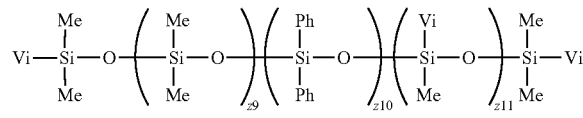

wherein 100≤z9≤19,000, 1≤z10≤6,000, 1≤z11≤3,000, 102≤z9+z10+z11≤5 20,000.

Component (B)

Component (B) is an organopolysiloxane comprising $R^2_3SiO_{1/2}$ units and $SiO_{4/2}$ units in a mole ratio of $R^2_3SiO_{1/2}$ to $SiO_{4/2}$ of 0.5 to 1.5, preferably 0.6 to 1.3. If the more ratio is less than the lower limit or larger than the upper limit, the adhesion strength of a cured adhesive silicone layer is smaller, or adherence to a base material is smaller. Component (B) may optionally have a hydroxyl or alkoxy group bonded to a silicon atom. The alkoxy group has, for example, 1 to 6 carbon atoms.

$R^2$ is, independently of each other, a substituted or unsubstituted, monovalent hydrocarbon group having 1 to 10 carbon atoms, such as an alkyl group having 1 to 6 carbon atoms, such as a methyl group, an ethyl group, a propyl group and a butyl group; a cycloalkyl group having 5 to 8 carbon atoms, such as a cyclohexyl group; an aryl group having 6 to 10 carbon atoms, such as a phenyl group and a tolyl group; an aralkyl group having 7 to 10 carbon atoms, such as a benzyl group; an alkenyl group having 2 to 8 carbon atoms, such as a vinyl group, an allyl group and a hexenyl group; and these hydrocarbon group having 1 to 10 carbon atoms of which a part or all of the hydrogen atoms bonded each to a carbon atom is substituted with a hydroxy group, a cyano group, a halogen group, an alkoxysilyl group, a polyoxyalkylene group, an epoxy group or a carboxyl group. Among them, a methyl group and a phenyl group are preferred, and a methyl group is particularly preferred.

Component (B) may have a hydroxyl group bonded to a silicon atom (i.e., a silanol group) or an alkoxy group, preferably having 1 to 6 carbon atoms, bonded to a silicon atom. The amount of the silanol group-containing siloxane unit is preferably such that a hydroxyl group content is 0.1 to 5% by mass, preferably 0.2 to 4% by mass, of component (B). If the hydroxyl group content exceeds the upper limit, an adhesion strength of a cured adhesive silicone layer may be lower or curability may be poor. The amount of the alkoxy group-containing siloxane unit is preferably such that the content of the alkoxy group is 10% by mass or less, preferably 8% by mass or less, of component (B). If the alkoxy group content exceeds the upper limit, an adhesion strength of a cured adhesive silicone layer may be lower or curability may be poorer. The total content of the silanol group and the alkoxy group is preferably 0.1 to 12% by mass, particularly 0.2 to 10% by mass, in component (B). These hydroxyl group and alkoxy group may condensation-react with the hydroxyl group of component (A) or (A').

Examples of the alkoxy group having 1 to 6 carbon atoms include a methoxy group, an ethoxy group, a propoxy group, an isopropoxy group, and a phenoxy group. The silanol group-containing unit includes $R^2_2(OH)SiO_{0.5}$ unit, $R^2(OH)_2SiO_{0.5}$ unit, $R^2(OH)SiO$ unit and $(OH)SiO_{1.5}$ unit. The alkoxy group-containing unit includes $R^2_2(OR')SiO_{0.5}$ unit, $R^2(OR')_2SiO_{0.5}$ unit, $R^2(OR')SiO$ unit and $(OR')SiO_{1.5}$ unit, wherein OR' is, independently of each other, an alkoxy group having 1 to 6 carbon atoms, as mentioned above. Where component (B) is composed of $R^2_3SiO_{0.5}$ unit and $SiO_2$ unit, the hydroxyl group or the alkoxy group may be bonded to a silicon atom of the $SiO_2$ unit.

Component (B) essentially comprises $R^2_3SiO_{0.5}$ units and $SiO_2$ units, and may further comprise $R^2SiO_{1.5}$ unit and/or $R^2_2SiO$ unit, wherein $R^2$ is as described above, as long as the properties of the present invention are not impaired. A total content of the $R^2_3SiO_{0.5}$ unit and the $SiO_2$ unit in component (B) is not particularly limited, as long as the properties of the present invention are not impaired, but is preferably 80 to 100 mole %, more preferably 90 to 100 mole %, of the total moles of the siloxane units in component (B).

Component (B) preferably has a weight average molecular weight of 500 to 10,000, more preferably 1,000 to 8,000. The weight average molecular weight is usually determined in gel permeation chromatography (GPC) using toluene or tetrahydrofuran (THF) as a developing solvent, and reduced to polystyrene.

Component (B) may be alone or in combination thereof.

A ratio by mass of component (A) to component (B), (A)/(B), is 100/0 to 40/60. When the composition is used as an adhesive layer of a film or tape, the ratio is preferably 100/0 to 70/30, more preferably 100/0 to 80/20, further preferably 100/0 to 90/10, from the viewpoint of adhesion strength. If the proportion of component (B) exceeds the upper limit, adherence to a base material may be lower. The proportion of component (B) may be zero. Where component (A') is contained, a ratio of a total mass of component (A) and component (A') to a mass of component (B) is 99/1 to 40/60, preferably 95/5 to 70/30, and more preferably 90/10 to 80/20.

Component (A) and component (B) may be reacted with each other in a hydrolytic condensation reaction or condensation reaction of the hydroxyl group of component (A) with the alkoxy or hydroxyl group of component (B) to form a condensation product, which is then mixed with the other components. Alternatively, component (B) is subjected to a hydrolytic condensation reaction or a condensation reaction with itself to form a condensation product, which is then mixed with component (A) and the other components. Alternatively, where the composition contains component (A'), the hydroxyl group of component (A), the hydroxyl group of component (A') are reacted with the alkoxy group or hydroxyl group of component (B) in a hydrolytic condensation reaction or condensation reaction to form a condensation product, which is then mixed with the other components. Alternatively, the hydroxyl group of component (A') is reacted with the alkoxy or hydroxyl group of component (B) in a hydrolytic condensation reaction or a condensation reaction to form a condensation product, which is then mixed with component (A) having no hydroxyl group and the other components. To conduct the condensation reaction, a mixture of component (A) and/or component (A') and component (B) dissolved in a solvent such as toluene may be reacted in the presence of an alkaline catalyst at room temperature (25 degrees C.) or under refluxing and, if needed, neutralized. Preferably, the condensation product has a hydroxyl group content in the SiOH group (silanol group) of 4.1% by mass or less, particularly 3.5% by mass or less. Accordingly, the adhesive silicone composition of the present invention may be a mixture comprising the condensation product of component (A) and/or component (A') with component (B), component (C), component (D), and component (E).

The alkaline catalyst may be metal hydroxides, such as lithium hydroxide, sodium hydroxide, potassium hydroxide, and calcium hydroxide; carbonates, such as sodium carbonate and potassium carbonate; bicarbonate, such as sodium hydrogen carbonate and potassium bicarbonate; metal alkoxides, such as sodium methoxide and, potassium butoxide; organometals, such as butyllithium; potassium silanolate; nitrogen compounds, such as ammonia gas, ammonia water, methylamine, trimethylamine and triethylamine. Ammonia gas and ammonia water are preferred.

The temperature in the condensation reaction may be from 10 to 150 degrees C., usually from room temperature (25 degrees C.) to a reflux temperature of the organic solvent. The reaction time is not particularly limited, but may be 0.5 to 20 hours, preferably 1 to 16 hours.

After the reaction, a neutralizing agent may be added, if necessary, to neutralize the alkaline catalyst. Examples of the neutralizing agent include acidic gases such as hydrogen chloride and carbon dioxide; organic acids such as acetic acid, octylic acid, and citric acid; and mineral acids such as hydrochloric acid, sulfuric acid, and phosphoric acid. When ammonia gas, ammonia water or an amine compound having a low boiling point is used as the alkaline catalyst, these may be distilled off, while letting an inert gas such as nitrogen to flow.

Component (C)

Component (C) is an organohydrogenpolysiloxane having at least 3 hydrogen atoms each bonded to a silicon atom in one molecule and having no aryl group. Component (C) may be alone or in combination thereof.

The SiH group of component (C) addition-reacts with the alkenyl group of component (A) to form a cured film. The amount of component (C) is such that a ratio of the number of the SiH groups in component (C) to the number of the alkenyl group in component (A) is 0.5 to 15, preferably 1 to 12, and more preferably 1.5 to 10. If the ratio is smaller than the lower limit, adherence to a base material is lower. If the ratio is larger than the upper limit, adhesion strength may become larger with time, or a pot life of a treatment bath containing the composition may be shorter.

Component (C) is preferably represented by the following average composition formula (2)

$$R^3_e H_f SiO_{(4-e-f)/2} \tag{2}$$

wherein $R^3$ is, independently of each other, a hydroxyl group, or a substituted or unsubstituted, monovalent hydrocarbon group having no aliphatic unsaturated bond, other than aryl group-containing organic group (particularly, not an aryl group-containing organic group, nor an aralkyl group-containing organic group), e and f are a positive number, and e+f≤3.

Examples of the monovalent hydrocarbon group include an alkyl group having 1 to 6 carbon atoms, such as a methyl group, an ethyl group, a propyl group, and a butyl group; a cycloalkyl group having 5 to 8 carbon atoms, such as a cyclohexyl group; or these groups of which a part or all of the hydrogen atoms are substituted with a hydroxy group, a cyano group, a halogen atom, an alkoxysilyl group, a polyoxyalkylene group, an epoxy group or a carboxyl group. $R^3$ is preferably an alkyl group, and more preferably a methyl group, an ethyl group, and a propyl group from the viewpoint of a higher addition reaction rate.

In formula (2), e is the real number larger than 0, preferably 0.1 to 2, f is the real number larger than 0, preferably 0.1 to 2, 0<e+f≤3, in particular 0.5<e+f≤2.8.

Component (C) may be linear, branched, or cyclic, or of a mixture thereof. Component (C) may be, for example, a polymer or copolymer comprising at least one of $R^3HSiO_{2/2}$ unit, $HSiO_{3/2}$ unit, and $R^3_2HSiO_{2/2}$ unit, and optionally comprising at least one of $R^3_2SiO_{2/2}$ unit, $R^3SiO_{3/2}$ unit, and $R^3_3SiO_{1/2}$ unit, wherein $R^3$ is as defined above. Component (C) preferably comprises at least three, preferably 5 to 300, of $R^3HSiO_{2/2}$ or $R^3_2HSiO_{1/2}$ unit in a molecule. In addition, $SiO_{4/2}$ unit may be contained in such an amount that the effects of the present inventions are not impaired.

Thus, component (C) has 3 to 300, preferably 5 to 200, SiH groups in a molecule. If the number of the SiH groups is less than the lower limit or larger than the upper limit, curability or adherence may be poor.

Component (C) preferably has a viscosity of 0.001 to 10 Pa·s, particularly 0.005 to 5 Pa·s, at 25 degrees C. If the viscosity is too low, curability or adherence may be poor. If it is too high, workability or adherence may be poor.

Examples of component (C) include, but are not limited to, the following compounds. The indication, Me in the following formula represents a methyl group. The order of the siloxane units in parentheses is not limited, and may be at random or in block. In the following formulas, the total number of the repeating siloxane units is on average.

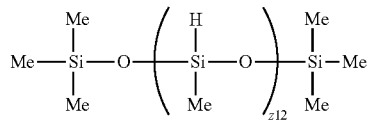
wherein $3 \leq z12 \leq 300$.
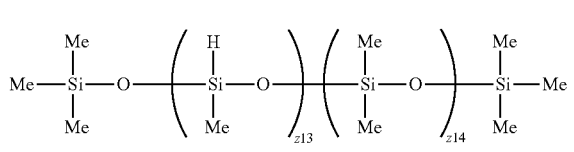
wherein $3 \leq z13 \leq 300$, $1 \leq z14 \leq 500$.
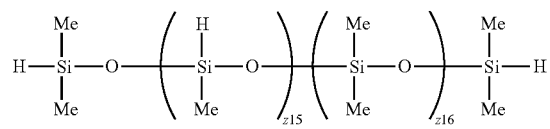
wherein $1 \leq z15 \leq 298$, $1 \leq z16 \leq 500$.
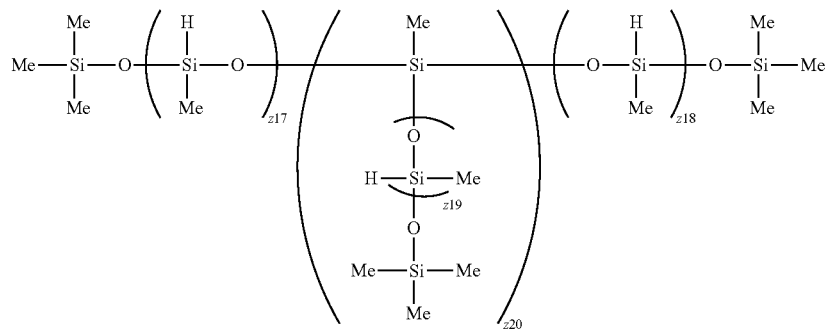
wherein $0 \leq z17 \leq 100$, $0 \leq z18 \leq 100$, $0 \leq z19 \leq 100$, $1 \leq z20 \leq 50$, provided that the total number of the SiH group is 3 to 300, preferably 5 to 200, in a molecule.
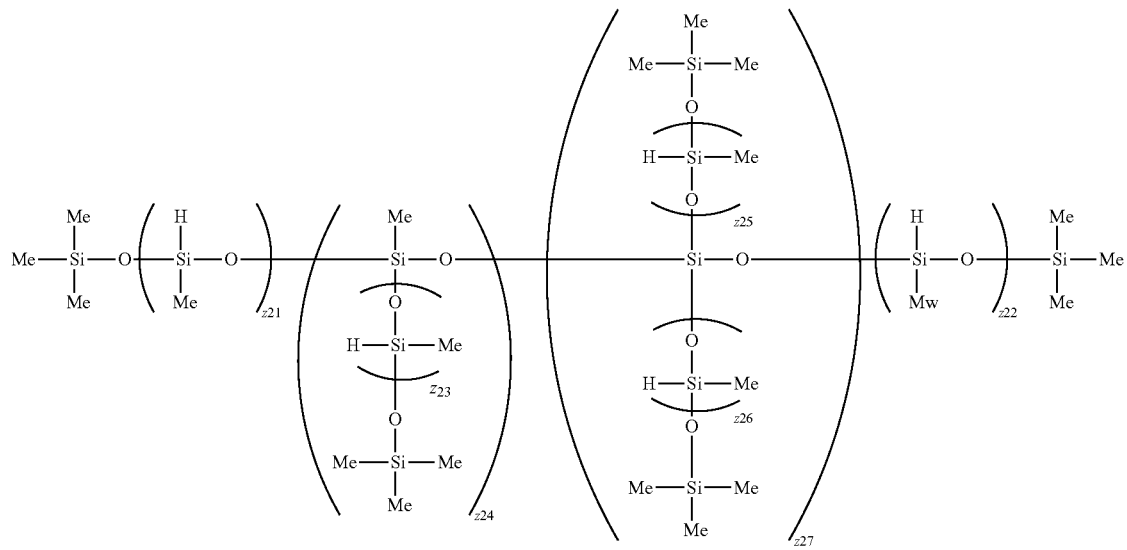

wherein 0≤z21≤100, 0≤z22≤100, 0≤z23≤100, 0≤z24≤50, 0≤z25≤100, 0≤z26≤100, 1≤z27≤50, provided that the total number of the SiH group is 3 to 300, preferably 5 to 200, in a molecule.

Component (D)

Component (D) is a catalyst for promoting the addition reaction of component (A) and, optionally, component (G) with component (C) and component (E). Any catalyst which promotes a so-called hydrosilylation reaction may be used, such as known platinum group metal-based catalysts. Examples of the platinum group metal-based catalyst include platinum-based, palladium-based, rhodium-based, ruthenium-based, and iridium-based catalysts. The platinum-based catalyst is preferable. Examples of the platinum-based catalyst include platinic acid chloride, a solution of platinic acid chloride in alcohol or in aldehyde, a reactant of platinic acid chloride with an alcohol, and a complex of platinic acid chloride or platinum with various olefins or vinylsiloxanes.

The amount of component (D) may be a catalyst amount. The catalyst amount is an amount effective to promote an addition reaction of component (A) and component (G) with component (C) and component (E). In order to obtain a good cured film, the catalytic amount is 1 to 5,000 ppm, preferably 5 to 500 ppm, particularly preferably 10 to 200 ppm, reduced to mass of the platinum group metal, based on a total mass of component (A) and component (B). If the amount is less than the lower limit, the curability may be poor, or the crosslinking density may be low, so that the adhesion strength and the adherence may be poor. If the amount is larger than the upper limit, a life time of a treatment bath may be shorter.

Component (E)

Component (E) is an organohydrogenpolysiloxane having at least three hydrogen atoms each bonded to a silicon atom in a molecule and having an aryl group-containing organic group, wherein a ratio of the number of the aryl group-containing organic groups to a total of the number of the hydrogen atoms each bonded to a silicon atom and the number of the groups each bonded to a silicon atom is 0.05 to 0.40. The aryl group-containing organic group is preferably an aryl group bonded to a silicon atom and an aralkyl group bonded to a silicon atom.

Component (E) may be alone or in combination thereof.

The amount of component (E) is 0.01 to 10 parts by mass, preferably 0.05 to 8 parts by mass, more preferably 0.1 to 5 parts by mass, per total 100 parts by mass of component (A) and component (B), provided that a ratio of the number of the SiH groups in component (E) to the number of the alkenyl groups in component (A) is 0.1 to 15, preferably 0.5 to 12, and more preferably 0.8 to 10. If the amount is less than the above-mentioned lower limit, adherence to a base material is insufficient. If it is larger than the upper limit, transparency of a cured film is less or an adhesion strength increases with time. Further, the amount of component (B) is preferably 10 parts by mass or more, more preferably 15 parts by mass to 90 parts by mass, and further preferably 20 to 85 parts by mass, per total 100 parts by mass of component (B) and component (E).

Component (E) has the aryl group-containing organic group in such a ratio that the number of the aryl group-containing organic groups to the total number of the groups each bonded to a silicon atom and the hydrogen atoms each bonded to a silicon atom is 0.05 to 0.40, preferably 0.08 to 0.30, more preferably 0.10 to 0.25.

It is preferred that [the aforesaid ratio of the number of the aryl group-containing organic group groups in component (E)]-[the aforesaid ratio of the number of the aryl group-containing hydrocarbon groups in component (A)] is at least 0.05, more preferably, at least 0.07, further preferably at least 0.09. The upper limit is not particularly limited, but is preferably 0.4 or less, more preferably 0.3 or less, and still more preferably 0.25 or less. Then, a cured film has improved adherence to a base material.

On account of the requirement that component (E) has the aryl group-containing organic group in the aforesaid range, compatibility of component (E) with component (A) and component (B) is lower, and it is considered that component (E) moves, accordingly, locally to the vicinity of a base material with the progress of the crosslinking reaction. Then, the SiH group in component (E) interacts with a functional group present on the surface of the base material. Particularly when the base material is a plastic film, the aryl group in component (E) and the n electrons of the aromatic ring in the plastic interact with each other to cause the stacking effect, thereby improving the adherence. Further, such component (E) is less compatible with glass, which may suppress increase in an adhesion strength with time.

If the ratio of the aryl group-containing organic group is less than the lower limit or larger than the upper limit, a cured film does not show good adherence to a base material.

The number of the aryl group-containing organic groups includes the number of aryl groups possessed by the aralkyl groups, as defined above. The groups each bonded to a silicon atom include, for example, a hydroxyl group, an alkyl group, an aryl group, an aralkyl group, and an alkyl group whose hydrogen atom is substituted with a halogen atom or other substituent. More specifically, the groups represented by the following $R^{10}$ may be named.

Component (E) preferably has an average degree of polymerization of 500 or less, more preferably 5 to 500, further preferably 15 to 450. If the average degree of polymerization is less than the lower limit or larger than the upper limit, adherence of a cured film to a base material may be lower.

Component (E) is represented, for example, by the following average compositional formula (7)

$$R^{10}_p H_q SiO_{(4-p-q)/2} \tag{7}$$

wherein $R^{10}$ is, independently of each other, a hydroxyl group or a substituted or unsubstituted, monovalent hydrocarbon group having no aliphatic unsaturated bond, wherein a part of $R^{10}$ is an aryl group-containing organic group so that a ratio of the number of the aryl group-containing organic group to the total of the number of $R^{10}$ and the number of the hydrogen atoms each bonded to a silicon atom is 0.05 to 0.40, p and q are the real numbers larger than zero, and p+q≤3.

The monovalent hydrocarbon group include alkyl groups having 1 to 6 carbon atoms, such as a methyl group, an ethyl group, a propyl group, and a butyl group; cycloalkyl groups having 5 to 8 carbon atoms such as a cyclohexyl group; aryl groups having 6 to 10 carbon atoms, such as a phenyl group and a tolyl group; aralkyl groups having 7 to 10 carbon atoms, such as a benzyl group; and these of which a part or all of the hydrogen atoms each bonded to a carbon atom are substituted with a hydroxy group, a cyano group, a halogen atom, an alkoxysilyl group, a polyoxyalkylene group, an epoxy group or a carboxyl group. At least one of $R^{10}$ is an aryl group or an aralkyl group, preferably an aryl group. $R^{10}$ is preferably an alkyl group or an aryl group, more preferably a methyl group, an ethyl group, a propyl group, and a phenyl group.

p is preferably the real number of from 0.1 to 2.0, q is preferably the real number of from 0.1 to 2.0, and especially p and q satisfy the equation; $0.5<p+q\leq2.8$.

The organohydrogenpolysiloxane represented by the aforesaid formula (7) includes, for example, a polymer or copolymer comprises at least one of $R^{10}HSiO_{2/2}$ unit, $HSiO_{3/2}$ unit, and $R^{10}{}_2HSiO_{1/2}$ unit and, optionally, at least one of $R^{10}{}_2SiO_{2/2}$ unit, $R^{10}SiO_{3/2}$ units, and $R^{10}{}_3SiO_{1/2}$ unit. $R^{10}$ is as defined above. The polymer or copolymer preferably comprises at least 3, preferably at least 5, $R^{10}HSiO_{2/2}$ and/or $R^{1}{}_2HSiO_{1/2}$ units in a molecule. The polymer or copolymer may comprise $SiO_{4/2}$ unit in such an amount that the effects of the present inventions are not impaired.

The number of the SiH group in a molecule of the organohydrogenpolysiloxane is preferably 3 to 400, more preferably 5 to 300. When the number of SiH group is less than the lower limit or larger than the upper limit, curability of a composition or adherence of a cured film may be worse.

The structure of the organohydrogenpolysiloxane (E) may be linear, branched, cyclic, or of mixture thereof. The organohydrogenpolysiloxane (E) is preferably a linear one represented by the following formula (5):

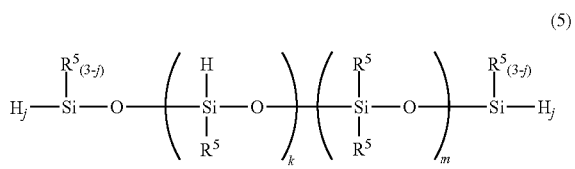

(5)

wherein $R^5$ is a substituted or unsubstituted, monovalent hydrocarbon group having 1 to 10 carbon atoms and having no aliphatic unsaturated bond, and at least one of $R^5$ is an aryl group-containing organic group having 6 to 10 carbon atoms, j is 0 or 1, k and m satisfy the equations: $1\leq k\leq400$, $0\leq m\leq400$, $3\leq2j+k\leq400$, and $3\leq k+m\leq498$.

The monovalent hydrocarbon for $R^5$ in formula (5) include alkyl groups having 1 to 6 carbon atoms, such as a methyl group, an ethyl group, a propyl group, and a butyl group; cycloalkyl groups having 5 to 8 carbon atoms such as a cyclohexyl group; aryl groups having 6 to 10 carbon atoms, such as a phenyl group and a tolyl group; aralkyl groups having 7 to 10 carbon atoms, such as a benzyl group; and these of which a part or all of the hydrogen atoms each bonded to a carbon atom are substituted with a hydroxy group, a cyano group, a halogen atom, an alkoxysilyl group, a polyoxyalkylene group, an epoxy group or a carboxyl group. At least one of $R^5$ is an aryl group or an aralkyl group, preferably an aryl group. $R^5$ is preferably an alkyl group or an aryl group, more preferably a methyl group, an ethyl group, a propyl group, or a phenyl group.

k is preferably an integer of from 10 to 300, m is preferably an integer of from 1 to 300, and j, k, and m preferably satisfy the equations: $5\leq2j+k\leq300$, and $13\leq k+m\leq448$.

Component (E) has a viscosity of 0.001 to 3 Pa·s, particularly 0.005 to 1 Pa·s, at 25 degrees C. If the viscosity is smaller than the lower limit or larger than the upper limit, the adherence to a base material is less or the adhesion strength may increase with time.

Examples of component (E) include, but are not limited to, the following ones. Here, Me and Ph represent a methyl group and a phenyl group, respectively. The bonding order of the siloxane units in parentheses is not limited and maybe at random or in block. In each of the following formulas, the numbers of the repeating siloxane units are on average.

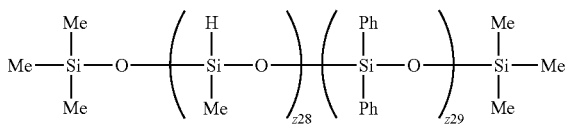

wherein $3\leq z28\leq400$, $1\leq z29\leq200$, $4\leq z28+z29\leq498$.

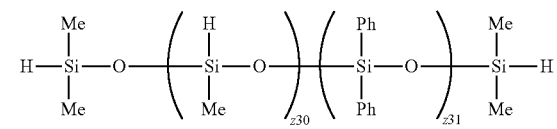

wherein $1\leq z30\leq398$, $1\leq z31\leq200$, $3\leq z30+z31\leq498$.

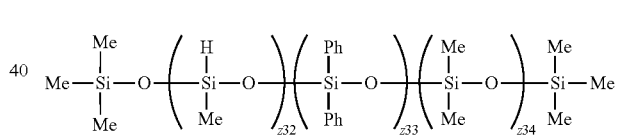

wherein $3\leq z32\leq400$, $1\leq z33\leq200$, $1\leq z34\leq200$, $5\leq z32+z33+z34\leq498$.

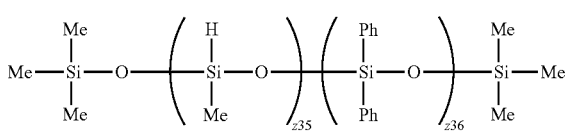

wherein $3\leq z35\leq400$, $2\leq z36\leq400$, $5\leq z35+z36\leq498$.

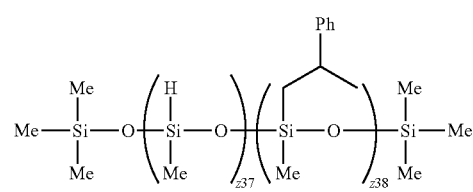

wherein $3\leq z37\leq400$, $2\leq z38\leq400$, $5\leq z37+z38\leq498$.

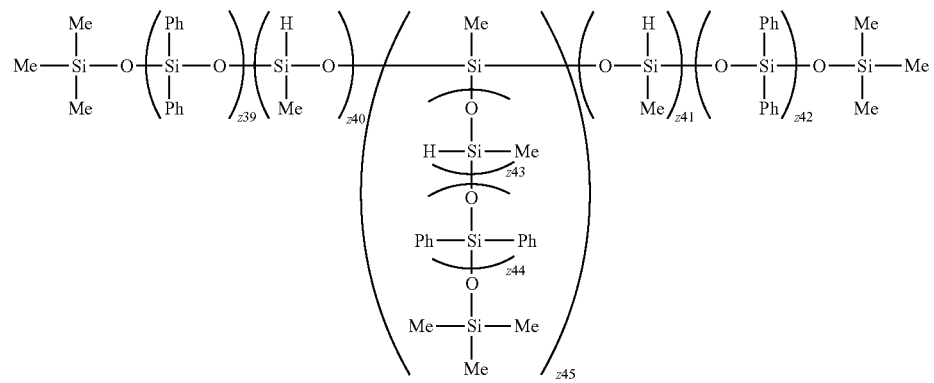

wherein $0 \leq z39 \leq 100$, $0 \leq z40 \leq 100$, $0 \leq z41 \leq 100$, $0 \leq z42 \leq 100$, $0 \leq z43 \leq 100$, $0 \leq z44 \leq 100$, $1 \leq z45 \leq 50$, provided that an average degree of polymerization of the siloxane is from 5 to 500, preferably from 15 to 450.

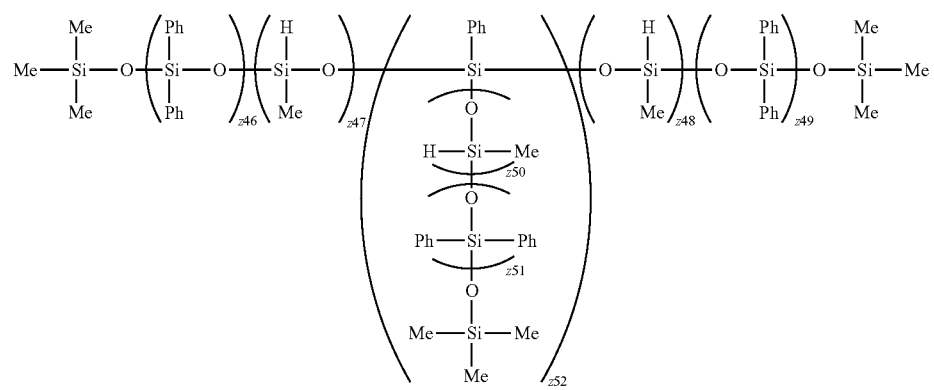

wherein $0 \leq z46 \leq 100$, $0 \leq z47 \leq 100$, $0 \leq z48 \leq 100$, $0 \leq z49 \leq 100$, $0 \leq z50 \leq 100$, $0 \leq z51 \leq 100$, $1 \leq z52 \leq 50$, provided that an average degree of polymerization of the siloxane is from 5 to 500, preferably from 15 to 450.

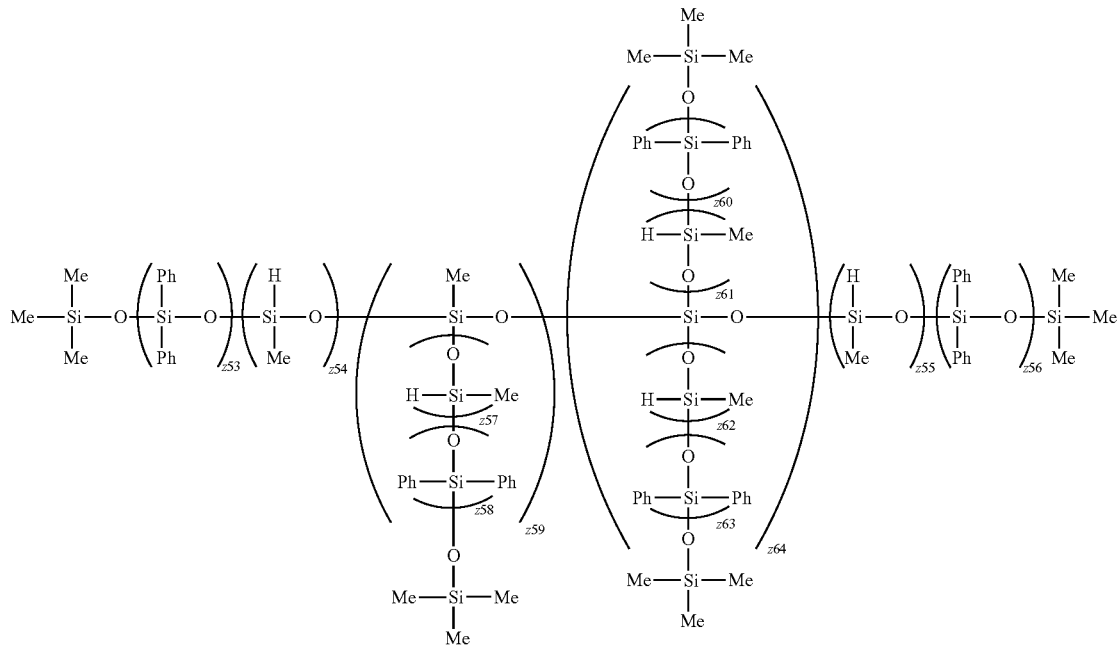

wherein 0≤z53≤100, 0≤z54≤100, 0≤z55≤100, 0≤z56≤100, 0≤z57≤100, 0≤z58≤100, 0≤z59≤50, 0≤z60≤100, 0≤z61≤100, 0≤z62≤100, 0≤z63≤100, 1≤z64≤50, provided that an average degree of polymerization of the siloxane is 5 to 500, preferably 15 to 450.

Component (F)

Component (F) is an addition-reaction control agent and is an optional component. Component (F) may be added to prevent a treatment liquid containing the adhesive composition from thickening or gelling, before heat curing, e.g., when the adhesive silicone composition is formulated or when the adhesive composition is applied on a base material. Examples thereof include various organic nitrogen compounds, organic phosphorus compounds, organic silicon compounds, acetylene compounds, oxime compounds, and organic chloro compounds.

More specifically, component (F) may be, for example, acetylene alcohols such as 3-methyl-1-butyn-3-ol, 3,5-dimethyl-1-hexin-3-ol, 3-methyl-1-pentene-3-ol, phenylbutynol, and 1-ethynyl cyclohexanol; acetylenic compounds such as 3-methyl-3-1-pentene-1-in, and 3,5-dimethyl-1-hexin-3-in; reaction products of these acetylenic compounds with alkoxysilanes or siloxanes or hydrogensilanes; vinyl siloxanes such as cyclic tetramethyl-vinyl siloxane; organic nitrogen compounds such as benzotriazole; and other organic phosphorus compounds, organic oxime compounds, and organic chloro compounds. Component (F) may be alone or in combination thereof.

The amount of component (F) is in the range of 0 to 8 parts by mass, preferably 0.05 to 8 parts by mass, more preferably 0.1 to 5 parts by mass, per total 100 parts by mass of components (A) and (B). If the amount exceeds the upper limit, curability of a composition may below.

Component (G)

The silicone composition of the present invention may further comprise (G) an organo(poly)siloxane or other organic compound having at least two alkenyl groups in a molecule in an alkenyl group content of 0.15 to 2.5 mol/100 g. Component (G) may be alone or in combination thereof.

The alkenyl group content of component (G) is from 0.15 to 2.5 mol/100 g, preferably from 0.18 to 2.3 mol/100 g, more preferably from 0.20 to 2.0 mol/100 g.

Component (G) makes it possible to further suppress increase in the adhesion strength to an adherend with time. This is presumably because the incorporation of even a small amount of the alkenyl group-rich component (G) into the alkenyl group-poor base composition for the adhesive silicone composition makes the crosslinking density of the entire adhesive layer larger, so that the hardness of the adhesive layer increases slightly and the adhesive layer does not bite into the adherend well. As long as the content of the alkenyl group is equal to or higher than the above-mentioned lower limit, the effect of component (G) can be obtained. If the content is larger than the above-mentioned upper limit, the adherence or the curability may be lower.

Examples of the alkenyl group-containing organic group include an alkenyl group such as a vinyl group, an allyl group, a hexenyl group, and an octenyl group; and a cycloalkenylalkyl group such as a cyclohexenylethyl group. Examples of the alkenyl group-containing monovalent hydrocarbon group which may have an oxygen atom include an acryloylalkyl group such as an acryloylpropyl group, an acryloylmethyl group, and a methacryloylpropyl group and a methacryloylalkyl group. It may also have ether linkages in the methylene chain, e.g., —$(CH_2)_2$—O—$CH_2$—CH=$CH_2$, and —$(CH_2)_3$O—$CH_2$—CH=$CH_2$.

The viscosity at 25 degrees C. of component (G) is preferably less than 1 Pa·s, more preferably in the range of from 0.1 mPa·s to 0.8 Pa·s, more preferably from 0.5 mPa·s to 0.5 Pa·s. If the viscosity is larger than the upper limit, migration of the molecules in the composition is restricted, so that the alkenyl groups may remain unreacted and the effect of component (G) is not exhibited.

Component (G) is preferably one represented by the following general formula (8). Component (G) may be alone or in combination thereof. The order of the siloxane units in parentheses is not limited and may be at random or in block. The compound represented by the following formula (8) has the alkenyl group content of from 0.15 to 2.5 mol/100 g, which differs from the alkenyl group content of component (A).

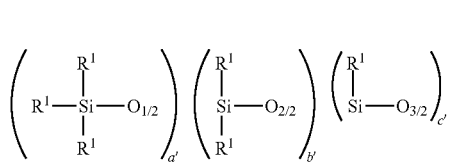
(8)

In formula (8), $R^1$ is, independently of each other, selected from the options for $R^1$ in component (A). This organopolysiloxane has at least two, alkenyl group-containing organic groups in a molecule. $R^1$ other than the alkenyl group-containing organic group is preferably an alkyl group, particularly a methyl group, an ethyl group, and a propyl group, from the viewpoint of releasability.

In formula (8), a' is an integer of 2 or more, b' is an integer of 0 or more, c' is an integer of 0 or more, d' is an integer of 0 or more, provided that the above-mentioned viscosity range is attained. Preferably, a' is an integer of from 2 to 100, b' is an integer of from 0 to 5,000, c' is an integer of from 0 to 50, d' is an integer of from 0 to 50, more preferably $2 \leq a'+b'+c'+d' \leq 5{,}000$, further more preferably $5 \leq a'+b'+c'+d' \leq 3{,}000$. If the sum of the numbers of the siloxane units, a'+b'+c'+d', exceeds the above-mentioned upper limit, migration of the molecules is restricted in the composition so as to leave unreacted alkenyl groups, and the effect of component (G) may not be attained.

Component (G) may an organic compound other than the organo(poly)siloxane, the organic compound having at least two alkenyl groups in an alkenyl group content of 0.15 to 2.5 mol/100 g. The organic compound is a hydrocarbon compound preferably having 5 to 85 carbon atoms, more preferably 5 to 70 carbon atoms, and may have an ether bond, an ester bond, a hydroxyl group, an epoxy group, and may have an aromatic group.

The amount of component (G) is preferably 0.01 to 10 parts by mass, particularly 0.05 to 8 parts by mass, per total 100 parts by mass of component (A) and component (B). If the amount exceeds the upper limit, curable or adherence may be low. If the amount is less than the lower limit, the effect of component (G) is not exhibited.

A ratio of the total number of the SiH group in component (C) and component (E) to the total number of the alkenyl group in component (A) and, if present, component (G) is preferably at least 0.5, more preferably from 0.7 to 20, still more preferably from 1.0 to 15. If the ratio is smaller than the lower limit, curability or adherence may be low.

Examples of component (G) include, but are not limited to, the following compounds. Here, Me and Vi stand for a methyl group and a vinyl group, respectively. The order of the siloxane units in parentheses is not limited and may be at random or in block. In each of the following formulas, the numbers of the repeating siloxane units are on average.

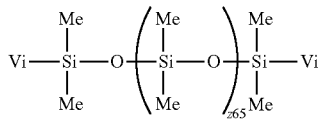

wherein $0 \leq z65 \leq 15$.

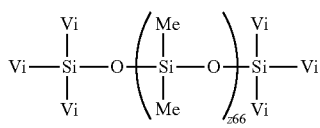

wherein $0 \leq z66 \leq 50$.

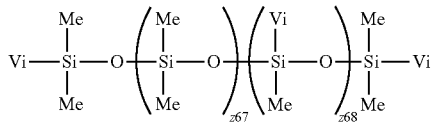

wherein $0 \leq z67 \leq 4{,}000$, $1 \leq z68 \leq 500$, $1 \leq z67+z68 \leq 4{,}500$.

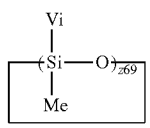

wherein $3 \leq z69 \leq 6$.

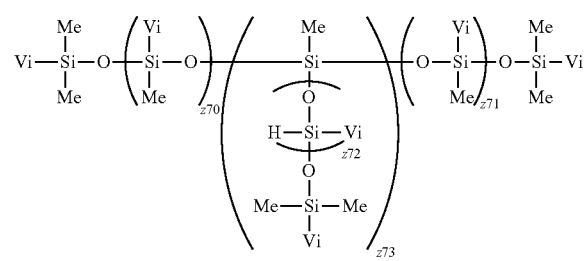

wherein $0 \leq z70 \leq 1{,}000$, $0 \leq z71 \leq 1{,}000$, $0 \leq z72 \leq 1{,}000$, $1 \leq z73 \leq 50$.

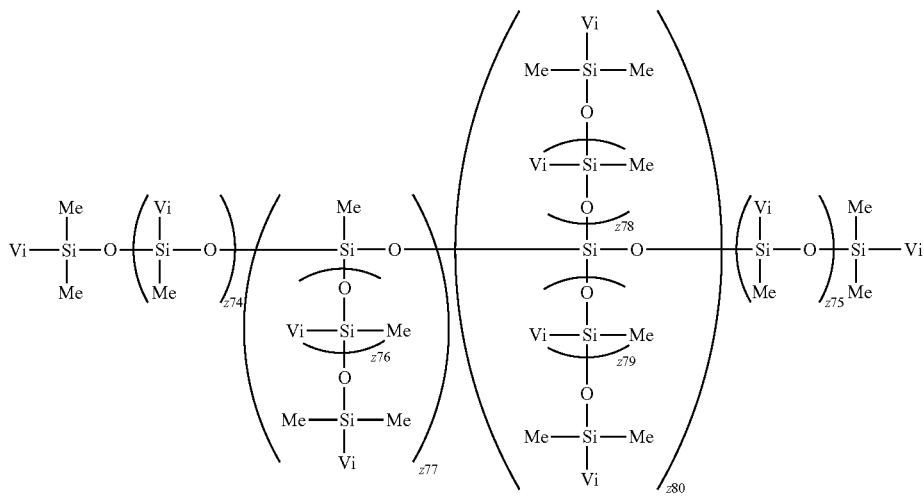

wherein $0 \leq z74 \leq 1,000$, $0 \leq z75 \leq 1,000$, $0 \leq z76 \leq 1,000$, $0 \leq z77 \leq 50$, $0 \leq z78 \leq 1,000$, $0 \leq z79 \leq 1,000$, $1 \leq z80 \leq 50$.

Examples of component (G) organic compound other than organo (poly) siloxanes include the following compounds.

$(1 \leq z81 \leq 80)$

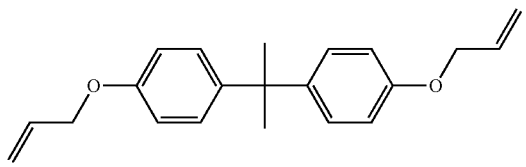

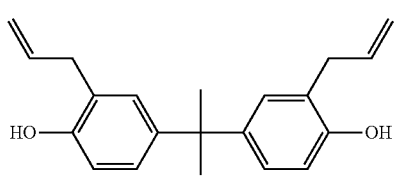

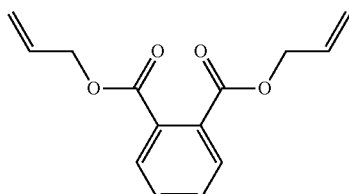

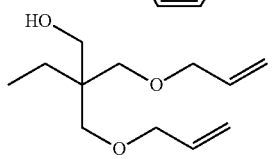

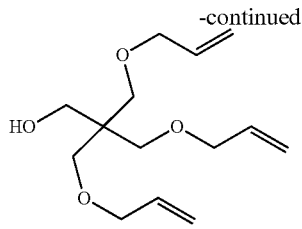

Component (H)

The silicone composition of the present invention may further comprise (H) an α-silyl aliphatic ester represented by the following formula (6). Component (H) may be alone or in combination thereof.

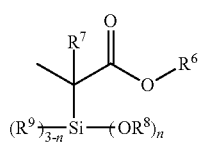

(6)

wherein $R^6$ is a monovalent hydrocarbon group having 1 to 20 carbon atoms, $R^7$ is a hydrogen atom or a methyl group, $R^8$ is, independently of each other, an unsubstituted or substituted alkyl group having 1 to 6 carbon atoms, $R^9$ is, independently of each other, an unsubstituted or substituted alkyl group having 1 to 6 carbon atoms, and n is an integer of 1 to 3.

In formula (6), $R^6$, monovalent hydrocarbon group having 1 to 20 carbon atoms, include an alkyl group such as a methyl group, an ethyl group, a propyl group, an isopropyl group, a butyl group, an isobutyl group, a sec-butyl group, a tert-butyl group, a pentyl group, a hexyl group, a heptyl group, an octyl group, a decyl group, a undecyl group, a dodecyl group, a tetradecyl group, a pentadecyl group, a hexadecyl group, a heptadecyl group, an octadecyl group, a nonadecyl group, and an icosyl group; a cycloalkyl group such as a cyclopentyl group, a cyclohexyl group, and a cycloheptylgroup; an aryl group such as a phenyl group, a tolyl group, and a naphthyl group; and an aralkyl group such as a benzyl group; and these of which a part or all of the hydrogen atoms are substituted with a hydroxyl group, a cyano group, a halogen atom, an alkoxysilyl group, a polyoxyalkylen group, an epoxy group, or a carboxyl group.

Examples of $R^8$ and $R^9$ include a methyl group, an ethyl group, a propyl group, an isopropyl group, a butyl group, an isobutyl group, and a tert-butyl group, particularly a methyl group and an ethyl group.

If water is present in the composition, the α-silyl aliphatic ester releases the silyl group from the carbon atom at the α-position to capture the water molecules, thereby to prevent disappearance of the SiH group of component (E), which group would contribute to the adherence, due to a dehydrogenation reaction with the water molecule. Thus, the adherence is maintained.

Examples of the α-silyl aliphatic ester include methyl α-trimethoxysilylpropionate, ethyl α-trimethoxysilylpropionate, propyl α-trimethoxysilylpropionate, butyl α-trimethoxysilylpropionate, pentyl α-trimethoxysilylpropionate, hexyl α-trimethoxysilylpropionate, octyl α-trimethoxysilylpropionate, decyl α-trimethoxysilylpropionate, cyclohexyl α-trimethoxysilylpropionate, isopropyl α-trimethoxysilylpropionate, phenyl α-trimethoxysilylpropionate, methyl α-triethoxysilylpropionate, ethyl α-triethoxysilylpropionate, propyl α-triethoxysilylpropionate, butyl α-triethoxysilylpropionate, pentyl α-triethoxysilylpropionate, hexyl α-triethoxysilylpropionate, octyl α-triethoxysilylpropionate, decyl α-triethoxysilylpropionate, cyclohexyl α-triethoxysilylpropionate, isopropyl α-triethoxysilylpropionate, phenyl α-triethoxysilylpropionate, methyl α-methyldimethoxysilylpropionate, ethyl α-methyldimethoxysilylpropionate, propyl α-methyldimethoxysilylpropionate, butyl α-methyldimethoxysilylpropionate, pentyl α-methyldimethoxysilylpropionate, hexyl α-methyldimethoxysilylpropionate, octyl α-methyldimethoxysilylpropionate, decyl α-methyldimethoxysilylpropionate, cyclohexyl α-methyldimethoxysilylpropionate, isopropyl α-methyldimethoxysilylpropionate, phenyl α-methldimethoxysilylpropionate, methyl α-methyldiethoxysilylpropionate, ethyl α-methyldiethoxysilylpropionate, propyl α-methyldiethoxysilylpropionate, butyl α-methyldiethoxysilylpropionate, pentyl α-methyldiethoxysilylpropionate, hexyl α-methyldiethoxysilylpropionate, octyl α-methyldiethoxysilylpropionate, decyl α-methyldiethoxysilylpropionate, cyclohexyl α-methyldiethoxysilylpropionate, isopropyl α-methyldiethoxysilylpropionate, phenyl α-methyldiethoxysilylpropionate, methyl α-dimethylmethoxysilylpropionate, ethyl α-dimethylmethoxysilylpropionate, propyl α-dimethylmethoxysilylpropionate, butyl α-dimethylmethoxysilylpropionate, pentyl α-dimethylmethoxysilylpropionate, hexyl α-dimethylmethoxysilylpropionate, octyl α-dimethylmethoxysilylpropionate, decyl α-dimethylmethoxysilylpropionate, cyclohexyl α-dimethylmethoxysilylpropionate, isopropyl α-dimethylmethoxysilylpropionate, phenyl α-dimethylmethoxysilylpropionate, methyl α-dimethylethoxysilylpropionate, ethyl α-dimethylethoxysilylpropionate, propyl α-dimethylethoxysilylpropionate, butyl α-dimethylethoxysilylpropionate, pentyl α-dimethylethoxysilylpropionate, hexyl α-dimethylethoxysilylpropionate, octyl α-dimethylethoxysilylpropionate, decyl α-dimethylethoxysilylpropionate, cyclohexyl α-dimethylethoxysilylpropionate, isopropyl α-dimethylethoxysilylpropionate, phenyl α-dimethylethoxysilylpropionate, methyl α-trimethylsilylpropionate, ethyl α-trimethylsilylpropionate, propyl α-trimethylsilylpropionate, butyl α-trimethylsilylpropionate, pentyl α-trimethylsilylpropionate, hexyl α-trimethylsilylpropionate, octyl α-trimethylsilylpropionate, decyl α-trimethylsilylpropionate, cyclohexyl α-trimethylsilylpropionate, isopropyl α-trimethylsilylpropionate, phenyl α-trimethylsilylpropionate, methyl α-triethylsilylpropionate, ethyl α-triethylsilylpropionate, propyl α-triethylsilylpropionate, butyl α-triethylsilylpropionate, pentyl α-triethylsilylpropionate, hexyl α-triethylsilylpropionate, octyl α-triethylsilylpropionate, decyl α-triethylsilylpropionate, cyclohexyl α-triethylsilylpropionate, isopropyl α-triethylsilylpropionate, and phenyl α-triethylsilylpropionate. Among these, ethyl α-trimethoxysilylpropionate and octyl α-methyldimethoxysilylpropionate are preferred because of their high capturing activity and availability.

The amount of component (H) is 0.01 to 5 parts by mass, preferably 0.05 to 4.5 parts by mass, and more preferably 0.1 to 4.0 parts by mass, per total 100 parts by mass of component (A) and component (B). If the amount exceeds the upper limit, adherence may be low.

Other Optional Components

Other optional components may be contained in the adhesive silicone composition of the present invention in addition to the above-mentioned components. Examples thereof include unreactive organopolysiloxanes such as polydimethylsiloxane and polydimethyldiphenylsiloxane; antioxidants such as phenols, quinones, amines, phosphorus compounds, phosphites, sulfur compounds, and thioethers; light stabilizers such as triazoles, benzophenones; flame retardants such as phosphate esters, halogen compounds, phosphorus compounds, and antimony type; antistatic agents such as cationic surface-active agents, anionic surface-active agents, and nonionic surface-active agents; dyes; pigments; antifoam agents; fillers; leveling agents; adherence-improving agents; thickeners; and solvents for reducing a viscosity in a coating step. Examples of the solvent include aromatic hydrocarbon solvents, such as toluene and xylene; aliphatic hydrocarbon solvents, such as hexane, heptane, octane, isooctane, decane, cyclohexane, methylcyclohexane and isoparaffin; hydrocarbon solvents such as industrial gasoline, petroleum benzine and sorbent naphtha; ketone solvents, such as acetone, methyl ethyl ketone, 2-pentanone, 3-pentanone, 2-hexanone, 2-heptanone, 4-heptanone, methyl isobutyl ketone, diisobutyl ketone, acetonyl acetone and cyclohexanone; ester solvents, such as ethyl acetate, propyl acetate, isopropyl acetate, butyl acetate, and isobutyl acetate; ether solvents, such as diethyl ether, dipropyl ether, dibutyl ether, 1,2-dimethoxyethane, and 1,4-dioxane; ester-ether solvents, such as 2-methoxyethylacetate, 2-ethoxyethylacetate, propyleneglycol monomethylether acetate, and 2-butoxyethyl acetate; siloxane solvents such as hexamethyldisiloxane, octamethyltrisiloxane, octamethylcyclotetrasiloxane, decamethylcyclopentasiloxane, tris(trimethylsiloxy) methylsilane, and tetrakis (trimethylsiloxy) silane, and mixtures thereof. The solvent may be alone or in combination thereof. The adhesive silicone composition of the present invention may be solvent-free.

The adhesive silicone composition of the present invention may be prepared by mixing and dissolving the above-described components. It is preferred for a long pot life to homogeneously mix components (A) to (C), component (E) and, if needed, components (F) to (H), and any optional components in advance, and adding component (D) immediately before use. As described above, component (A) and/or the optional component (A') may be condensation-reacted with component (B) in advance.

The adhesive silicone composition of the present invention may be applied on various base materials and cured in predetermined conditions to obtain a silicone adhesive layer. The adhesive silicone composition of the present invention may be suitably used to prepare an adhesive tape, an adhesive sheet, and an adhesive film which comprise a base material and a layer of a cured product of the composition applied on at least one side of the base material.

The base material may be paper, plastic films, glass, metal, or cloths. Examples of the paper include fine paper, coated paper, art paper, glassine paper, polyethylene-laminated paper, kraft paper, Japanese paper, and synthetic paper. Examples of the plastic films include polyethylene films, polypropylene films, polyester films, polyimide films, polyamide films, polyvinyl chloride films, polyvinylidene chloride film, polyvinyl alcohol film, polycarbonate films, polytetrafluoroethylene film, polystyrene film, ethylene-vinyl acetate copolymer films, ethylene-vinyl alcohol copolymer films, triacetylcellulose films, polyether ether ketone film, and polyphenylene sulfide films. There is no particular limitation on thickness or type also for the glass. The glass may be subjected to chemical strengthening treatment. Also, glass fibers may be used alone or as a composite with a resin. The metal may be aluminum foils, copper foils, gold foils, silver foils, or nickel foils.

The base material may have been subjected to primer treatment, corona treatment, etching treatment, sand blasting treatment, or plasma treatment in order to further improve the adherence between the base material and the adhesive silicone layer.

The surface of the base material opposite to the adhesive layer may preferably have been subjected to surface treatment for, e.g., scratch prevention, stain prevention, fingerprint prevention, anti-glare, anti-reflection, or antistatic. The base material may be coated with the adhesive layer and then subjected to the above-mentioned surface treatments, or may be subjected first to the surface treatment and then coated with the adhesive layer.

Examples of the scratch prevention treatment (hard-coat treatment) include treatment with a hard-coat agent of types of an acrylate, a silicone, an oxetane, an inorganic, or an organic-inorganic hybrid.

Examples of the antifouling treatment include treatment with an antifouling treatment agent, such as types of fluorines, silicones, ceramics, or photocatalysts.

Examples of the anti-reflection treatment include wet treatment by an anti-reflection agent of a type of fluorine or silicone, or dry treatment by vapor deposition or sputtering. Examples of the antistatic treatment include treatment with an antistatic agent of types of a surfactant, a silicone, an organoboron, a conductive polymer, a metal oxide, or a vapor-deposited metal.

Coating may be applied in any known coating method, using a coma coater, a lip coater, a roll coater, a die coater, a knife coater, a blade coater, a rod coater, a bar coater, a kiss coater, a gravure coater, screen coating, dip coating, or casting coating.

The amount to be applied by coating is appropriately set, depending on the application, and is usually preferably such which would give a thickness of the adhesive silicone layer in a range of 2 to 2,000 μm, particularly 3 to 1,000 μm, after cured.

Curing conditions of the adhesive silicone composition may be a temperature of 70 to 250 degrees C. for a period of 10 seconds to 10 minutes, but not limited to these.

The adhesive tape, sheet or film of the present invention may be produced by directly coating a base material with the adhesive silicone composition of the present invention, which is then cured to form an adhesive silicone layer, or by a transfer method in which the composition is applied on a release film or a release paper having a release coating, and cured to form an adhesive silicone layer, which adhesive silicone layer is then put on the base material.

The base material to be coated with the adhesive silicone composition of the present invention is preferably a plastic film. Adhesive tapes and films with a plastic film are usable in various applications. Examples of the adherend include glass, metal, and plastics. The adhesive film produced using the adhesive silicone composition of the present invention may be used in television sets, computer monitors, portable information terminal monitors, monitoring displays, video cameras, digital cameras, mobile phones, portable information terminals, displays for instrument panels of automobiles, displays for instrument panels of various facilities, apparatuses and equipment; and in touch panels and flat panel displays (FPDs) for displaying characters, symbols and images in automated ticket vending machines and automatic cash deposition or dispensing machines. The adhesive film may be used in displays or their touch panels of CRT displays, liquid crystal displays, plasma displays, organic EL displays, inorganic EL displays, LED displays, surface electrolytic displays (SED), and field emission displays (FED). The adhesive film of the present invention may be used for the purpose of preventing scratches, stain prevention, fingerprint prevention, static prevention, reflection prevention, or peeping prevention on the surface of these displays.

Further, the adhesive film of the present invention is suitable also as a protective film used in manufacturing various optical films and as a protective film used in manufacturing electronic components, such as a protective or masking adhesive film in processing optical components such as polarizing plates or light diffusing plates; and heat-resistant masking tapes used in processing electronic components such as flexible printed wiring boards.

EXAMPLES

The present invention will be explained below in further detail with reference to a series of the Examples and the Comparative Examples. However, the present invention is in no way limited by these Examples.

In the following, the viscosity is such at 25 degrees C., "part" is in mass, and the characteristics were determined according to the following test methods. Me means a methyl group and Vi means a vinyl group.

Adhesive Silicone Base Composition I

Preparation Example 1

Component (A) was dimethylpolysiloxane (90.0 parts by mass) of which both ends of the molecular chain were blocked by a vinyl group, and which had an alkenyl group content of 0.002 mol/100 g and was represented by the following formula.

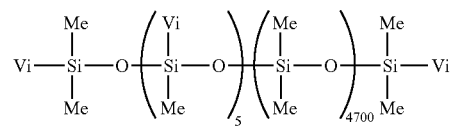

Component (B) was a 60% by mass solution in toluene (16.67 parts by mass) of a polysiloxane consisting of $Me_3SiO_{0.5}$ units and $SiO_2$ units in a mole ratio of $Me_3SiO_{0.5}$ units/SiO$_2$ units of 0.85, and having hydroxyl groups each bonded to a silicon atom of the SiO$_2$ units in a hydroxyl group content of 1.2% by mass, and having a weight-average molecular weight of 4,000.

Component (C) was a polyorganohydrogensiloxane (0.29 part by mass) represented by the following formula (C-1):

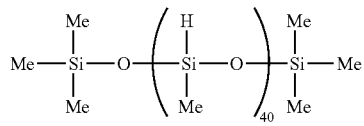

(C-1)

and a polyorganohydrogensiloxane (0.41 part by mass) represented by the following formula (C-2):

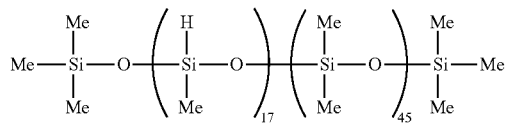

(C-2)

Component (F) was ethynylcyclohexanol (0.20 part by mass). Components (A), (B), (C) and (F) were mixed together, to which toluene was then added to obtain an adhesive silicone base composition I having a content of the effective components of about 60% by mass.

Adhesive Silicone Base Composition II without Component (B)

Preparation Example 2

Component (A) was a dimethylpolysiloxane (30.0 parts by mass) of which both ends of the molecular chain were blocked by a vinyl group and which had an alkenyl group content of 0.002 mol/100 g and was represented by the following formula:

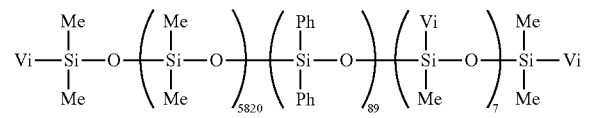

This component (A), the aforesaid component (C-1) (0.38 part by mass), and component (F) (0.20 part by mass) were mixed together, to which toluene was then added to obtain an adhesive silicone base composition II having a content of the effective components of about 30% by mass.

Solvent-Free Adhesive Silicone Base Composition III

Preparation Example 3

Component (A) was a dimethylpolysiloxane (100.0 parts by mass) of which both ends of the molecular chain blocked were by a vinyl group and which had an alkenyl group content of 0.004 mol/100 g and was represented by the following formula:

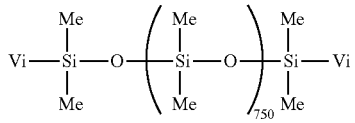

This component (A), the aforesaid component (C-1) (0.45 part by mass), and component (F) (0.10 part by mass) were mixed together to obtain an adhesive silicone base composition III.

Components (D) to (G) and comparative component (E2-1) used in the preparation of the adhesive silicone compositions were as follows.

Component (D)

(D-1) a solution of a 1,3-divinyl-1,1,3,3-tetramethyldisiloxane platinum (0) complex in toluene, containing 0.5% by mass of platinum (D-2) a solution of a 1,3-divinyl-1,1,3,3-tetramethyldisiloxane platinum (0) complex in silicone containing 0.5% by mass of platinum Component (E)

(E-1) methyl hydrogenpolysiloxane, represented by the following formula and having a ratio of the number of the aryl group-containing organic group of 0.096.

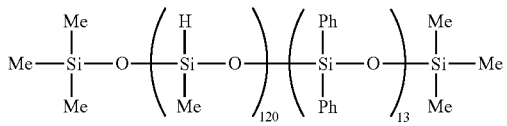

(E-2) methyl hydrogenpolysiloxane represented by the following formula and having a ratio of the number of the aryl group-containing organic group of 0.197.

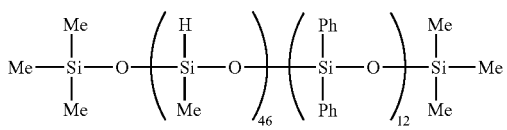

(E-3) methyl hydrogenpolysiloxane represented by the following formula and having a ratio of the number of the aryl group-containing organic group of 0.199

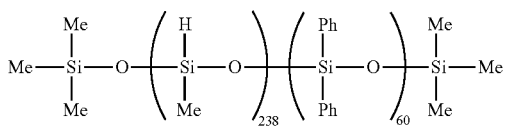

(E2-1) methyl hydrogenpolysiloxane represented by the following formula and having a ratio of the number of the aryl group-containing organic group of 0.000 (for comparison)

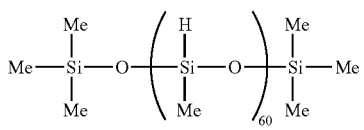

Component (G)

(G-1) organopolysiloxane represented by the following average compositional formula and having a viscosity at 25 degrees C. of 0.03 Pa·s and an alkenyl group content of 0.53 mol/100 g

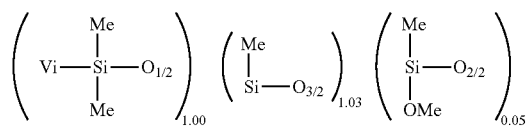

(G-2) organopolysiloxane represented by the following formula and having an alkenyl group content of 0.22 mol/100 g were placed 288.6 g (1.2 mol) of 1,3,5,7-tetramethylcyclotetrasiloxane, 300.0 g of toluene, and 0.06 g of a toluene solution (platinum content, 0.5% by mass) of 1,3-divinyl-1,1,3,3-tetramethyldisiloxane platinum (0) complex, and mixed, and heated to about 70 degrees C. To this, was then added dropwise 123.4 g (0.4 mol) of 2,2-bis(4-allyloxyphenyl)propane from the dropping funnel, and heated to about 80 to 85 degrees C. after completion of the dropping, and allowed to react at this temperature for 1 hour. Then, 0.6 g of activated carbon was added to remove the catalyst platinum, mixed for 2 hours, and then the activated carbon was removed by filtration. The resulting liquid was subjected to a vacuum concentration at 90 degrees C. for 8 hours to obtain a colorless transparent liquid. Analysis showed that the liquid was a mixture of the compounds represented by the following formula, wherein r is of from 0 to 4, and the compound with r=2 was a major component.

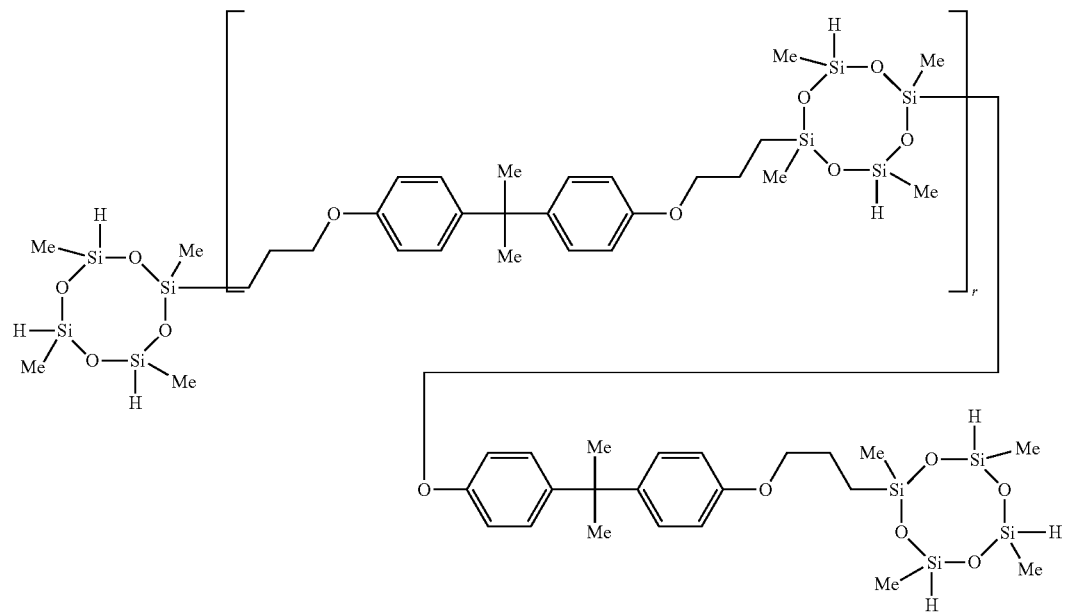

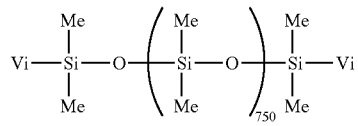

Component (H): ethyl α-trimethoxysilylpropionate (I) Manufacture of Additives for the Comparative Examples Adherence improver (I-1), as described in Patent Literature 6 (WO2015/194389) and Patent Literature 7 (JP Application Laid-Open 2015-178584

In a one-liter separable flask equipped with a stirrer, a thermometer, a dropping funnel and a reflux condenser tube, Adherence improver (I-2) as described in Patent Literature 5 (JP Application Laid-Open 2015-074741))

In a 500-mL separable flask equipped with a stirrer, a thermometer, a dropping funnel, and a reflux condenser tube, were placed 33.2 g (0.14 mol, 9.5 mol %) of 3-glycidoxypropyltrimethoxysilane, 63.6 g (0.48 mol, 32.5 mol %) of methylvinyldimethoxysilane, 103.2 g (0.86 mol, 58.0 mol %) of dimethyldimethoxysilane, and 16.0 g of methanol, to which a solution consisting of 39.2 g of water, 50.6 g of methanol, and 1.4 g of 28% ammonia water was added dropwise at room temperature, and mixed at room temperature for 16 hours. Thereafter, the mixture was concentrated under reduced pressure at 60 degrees C. for 4 hours and subjected to filtration to obtain a colorless, transparent and oily adherence improver having a weight average molecular weight of 1,200.

Examples 1~7 and Comparative Examples 1-6

The adhesive silicone base composition I, component (E) or comparative component (E2-1), component (G), component (H), and component (I) were placed in a flask in the amounts shown in Tables 1 and 2, to which 50 parts by mass of toluene was added and stirred to dissolve them. To the resulting solution, 0.5 part by mass of component (D-1) was added and stirred to obtain an adhesive silicone composition. An adhesive tape was prepared using this adhesive silicone composition and its adhesion strength and adherence were determined with time in the manner described below. The results are as seen in Tables 1 and 2.

Examples 8 and 9 and Comparative Example 7

The adhesive silicone base composition II, component (E), and component (G) were placed in a flask in the amounts shown in Table 3 and stirred to dissolve them. To the resulting solution, 0.2 part by mass of component (D-1) was added and mixed to prepare an adhesive silicone composition. An adhesive tape was prepared using this adhesive silicone composition and its adhesion strength and adherence were determined with time in the manner described below. The results are as seen in Table 3.

Examples 10 and 11 and Comparative Examples 8 to 10

The adhesive silicone base composition III, component (E), component (G), component (H), and component (I) were placed in a flask in the amounts shown in Table 3 and stirred to dissolve them. To the resulting solution, 0.5 part by mass of component (D-2) was added and mixed to prepare an adhesive silicone composition. An adhesive tape was prepared using this adhesive silicone composition and its adhesion strength and adherence were determined with time in the manner described below. The results are as seen in Table 3.

Adhesion Strength Test

Each of the adhesive silicone compositions obtained was applied, using an applicator, on a polyethylene terephthalate (PET) film having a thickness of 23 μm and a width of 25 mm so as to have a coating thickness of 30 μm after cured, and then heated to cure at 130 degrees C. for one minute to prepare an adhesive tape. The adhesive tape was adhered on a glass plate, and pressed by two cycles of motion of a 2 kg-weight roller covered with a rubber layer. The glass plate to which the adhesive tape was adhered was left at room temperature (25 degrees C., 50% RH) or at 60 degrees C., 90% RH for predetermined days, and then taken out. A force (in N/25 mm) required to peel the tape off from the glass plate at 1800 in a rate of 0.3 m per minute was determined with a tensile tester.

Adherence Test

An adhesive tape was prepared as described above. After the adhesive tape was left at room temperature (25 degrees C., 50% RH) or at 60 degrees C., 90% RH, a part of the cured adhesive layer was scratched with a projection such as a nail or a cutter, and this part was rubbed with a finger abdomen to see if the cured adhesive layer was peeled off from the base material to evaluate adherence. The results are rated as follows.

G: The cured adhesive layer is not peeled off from the base material.

M: The cured adhesive layer is partially peeled off from the base material.

B: The cured adhesive layer is entirely peeled off from the base material.

TABLE 1

| | | Example | | | | | | |
|---|---|---|---|---|---|---|---|---|
| | | 1 | 2 | 3 | 4 | 5 | 6 | 7 |
| Adhesive silicone base I, part by mass | | 100 | 100 | 100 | 100 | 100 | 100 | 100 |
| Component (E), part by mass | (E-1) | 0.2 | | | 0.2 | 0.4 | 0.2 | |
| | (E-2) | | 0.2 | | | | | 0.2 |
| | (E-3) | | | 0.2 | | | | |
| | (E2-1) for comparison | | | | | | | |
| Component (G), part by mass | (G-1) | | | | 0.2 | 0.4 | | 0.2 |
| | (G-2) | | | | | | 0.2 | |
| Component (H), part by mass | (H) | | | | | | | 0.2 |
| Additive (I) for comparison, part by mass | (I-1) | | | | | | | |
| | (I-2) | | | | | | | |
| Ratio of the numbers, H/Vi [(C)]/[(A)] | | 5.0 | 5.0 | 5.0 | 5.0 | 5.0 | 5.0 | 5.0 |
| Ratio of the numbers, H/Vi [(E)]/[(A)] | | 2.2 | 1.6 | 1.7 | 2.2 | 4.5 | 2.2 | 1.6 |
| Adhesion strength, N/25 mm | room temp., after one day | 0.04 | 0.05 | 0.05 | 0.04 | 0.06 | 0.04 | 0.05 |
| | room temp., after seven days | 0.06 | 0.04 | 0.04 | 0.05 | 0.06 | 0.05 | 0.05 |
| | 60 degrees C., 90% RH, after one day | 0.08 | 0.10 | 0.10 | 0.07 | 0.08 | 0.07 | 0.05 |
| | 60 degrees C., 90% RH, after seven days | 0.16 | 0.17 | 0.15 | 0.12 | 0.12 | 0.13 | 0.11 |
| Adherence | room temp., after one day | G | G | G | G | G | G | G |
| | room temp., after seven days | G | G | G | G | G | G | G |
| | 60 degrees C., 90% RH, after one day | G | G | G | G | G | G | G |
| | 60 degrees C., 90% RH, after seven days | G | G | G | G | G | G | G |

TABLE 2

| | | Comparative Example | | | | | |
|---|---|---|---|---|---|---|---|
| | | 1 | 2 | 3 | 4 | 5 | 6 |
| Adhesive silicone base I, part by mass | | 100 | 100 | 100 | 100 | 100 | 100 |
| Component (E), part by mass | (E-1) | | | | | | |
| | (E-2) | | | | | | |
| | (E-3) | | | | | | |
| | (E2-1) for comparison | | 0.2 | | | | |
| Component (G,) part by mass | (G-1) | | | 0.2 | | 0.2 | |
| | (G-2) | | | | | | |
| Component (H), part by mass | (H) | | | | | | |
| Additive (I) for comparison, part by mass | (I-1) | | | | 0.2 | 0.2 | |
| | (I-2) | | | | | | 0.5 |
| Ratio of the numbers, H/Vi [(C)]/[(A)] | | 5.0 | 5.0 | 5.0 | 5.0 | 5.0 | 5.0 |
| Ratio of the numbers, H/Vi [(E)]/[(A)] | | — | 2.9 | — | — | — | — |
| Adhesion strength, N/25 mm | room temp., after one day | 0.04 | 0.04 | 0.05 | 0.08 | 0.06 | 0.05 |
| | room temp., after seven days | 0.06 | 0.04 | 0.06 | 0.09 | 0.08 | 0.05 |
| | 60 degrees C., 90% RH, after one day | 0.09 | 0.07 | 0.18 | 0.16 | 0.14 | 0.06 |
| | 60 degrees C., 90% RH, after seven days | 0.13 | *1 | *1 | *1 | *1 | 0.23 |
| Adherence | room temp., after one day | G | G | G | G | G | G |
| | room temp., after seven days | M | M | M | G | G | B |
| | 60 degrees C., 90% RH, after one day | B | B | B | G | G | B |
| | 60 degrees C., 90% RH, after seven days | B | B | B | G | G | G |

※1: The adhesive layer remained on the glass plate.

As seen in Table 2, the composition of Comparative Example 1 containing no adherence improver and the composition of Comparative Example 2 containing component (E2) having no aryl group, and the composition of Comparative Example 3 containing component (G) without component (E) failed to have good adherence over time. The compositions of Comparative Examples 4 and 5 containing the comparative adherence improver (I-1) showed the good adherence, but their adhesion strengths increased with time so that after 7 days at 60 degrees C., 90% RH, the adhesive layer remained on the glass surface. The composition of Comparative Example 6 containing the comparative adherence improver (I-2) showed the good initial adherence and the good adherence after 7 days at 60 degrees C., 90% RH, but the adherence after 7 days at room temperature and after one day at 60 degrees C., 90% RH was bad.

On the other hand, as seen in Table 1, the adhesive silicone compositions of the present invention (Examples 1 to 7) containing component (E) which was an adherence-improving agent exhibited good adherence at room temperature and at 60 degrees C., 90% RH, even applied in one coating step. Increase in adhesion strength with time was suppressed.

TABLE 3

| | | Example | | | | Comparative Example | | | |
|---|---|---|---|---|---|---|---|---|---|
| | | 8 | 9 | 10 | 11 | 7 | 8 | 9 | 10 |
| Adhesive silicone base II, part by mass | | 100 | 100 | | | 100 | | | |
| Adhesive silicone base III, part by mass | | | | 100 | 100 | | 100 | 100 | 100 |
| Component (E), part by mass | (E-1) | 0.2 | 0.2 | 0.8 | 0.8 | | | | |
| Component (G), part by mass | (G-1) | | 0.2 | 0.8 | 0.8 | | | | 0.8 |
| Component (H), part by mass | (H) | | | | 0.4 | | | | |
| Additive (I) for comparison, part by mass | (I-1) | | | | | | | 0.8 | 0.8 |
| Ratio of the numbers, H/Vi [(C)]/[(A)] | | 10.0 | 10.0 | 2.0 | 2.0 | 10.0 | 2.0 | 2.0 | 2.0 |

TABLE 3-continued

|  |  | Example | | | | Comparative Example | | | |
| --- | --- | --- | --- | --- | --- | --- | --- | --- | --- |
|  |  | 8 | 9 | 10 | 11 | 7 | 8 | 9 | 10 |
| Ratio of the numbers, H/Vi [(E)]/[(A)] | | 4.0 | 4.0 | 2.7 | 2.7 | — | — | — | — |
| Adhesion strength, N/25 mm | room temp., after one day | 0.07 | 0.06 | 0.03 | 0.04 | 0.10 | 0.05 | 1.19 | 0.03 |
|  | room temp., after seven days | 0.09 | 0.06 | 0.05 | 0.05 | 0.09 | 0.12 | *2 | 0.09 |
|  | 60 degrees C., 90% RH, after one day | 0.14 | 0.11 | 0.16 | 0.15 | 0.17 | 0.14 | *2 | 0.10 |
|  | 60 degrees C., 90% RH, after seven days | 0.25 | 0.23 | 0.31 | 0.29 | 0.29 | *1 | *1 | 0.76 |
| Adherence | room temp., after one day | G | G | G | G | G | G | G | G |
|  | room temp., after seven days | G | G | G | G | G | M | G | G |
|  | 60 degrees C., 90% RH, after one day | G | G | G | G | M | B | G | M |
|  | 60 degrees C., 90% RH, after seven days | G | G | G | G | B | B | M | B |

*1: The adhesive layer remained on the glass plate.
*2: The adhesive layer caused cohesive failure.

As seen in Table 3, even the adhesive silicone compositions (Examples 8 and 9) and the solvent-free adhesive silicone compositions (Examples 10 and 11), all of which did not contain component (B), showed the good adherence on account of component (E), and the suppressed increase in the adhesion strength with time. On the other hand, the adhesive silicone compositions of Comparative Examples 7 and 8 which did not contain the adherence-improving component (E) failed to have good adherence at 60 degrees C., 90%. In Comparative Examples 9 and 10 where the comparative adherence improver (I-1), the adherence was improved, but the adhesion strength increased with time.

INDUSTRIAL APPLICABILITY

The cured product formed by curing the adhesive silicone composition of the present invention has the excellent adherence to a base material and the suppressed increase in adhesion strength with time. This makes it possible to provide an adhesive film or tape having excellent stability.

The invention claimed is:

1. An adhesive silicone composition comprising the following components (A) through (E):
(A) a linear or branched organopolysiloxane having at least two alkenyl groups in a molecule in an alkenyl group content of at least 0.0005 mol/100g and less than 0.15 mol/100g, in an amount of 40 to 100 parts by mass,
(B) an organopolysiloxane comprising $R^2_3 SiO_{1/2}$ units and $SiO_{4/2}$ units, wherein $R^2$ is, independently of each other, a substituted or unsubstituted, monovalent hydrocarbon group having 1 to 10 carbon atoms, having a mole ratio of the $R^2_3 SiO_{1/2}$ units to the $SiO_{4/2}$ units being 0.5 to 1.5, and optionally having a hydroxyl or alkoxy group bonded to a silicon atom, in an amount of 60 to 0 parts by mass, provided that a total amount of components (A) and (B) is 100 parts by mass,
(C) an organohydrogenpolysiloxane having at least three hydrogen atoms each bonded to a silicon atom in a molecule and having no aryl group, in such an amount that a ratio of the number of the SiH groups in component (C) to the number of the alkenyl groups in component (A) is 0.5 to 15,
(D) a platinum group metal catalyst in a catalytic amount, and
(E) an organohydrogenpolysiloxane having at least three hydrogen atoms each bonded to a silicon atom in a molecule and having an aryl group-containing organic group, wherein a ratio of the number of the aryl group-containing organic group to a total of the number of the hydrogen atoms each bonded to a silicon atom and the number of groups each bonded to a silicon atom is 0.05 to 0.40, in an amount of 0.01 to 10 parts by mass per total 100 parts by mass of component (A) and component (B), provided that a ratio of the number of the SiH groups in component (E) to the number of the alkenyl groups in component (A) is 0.1 to 15.

2. The adhesive silicone composition according to claim 1, further comprising (F) an addition reaction control agent in an amount of 0.05 to 8 parts by mass per total 100 parts by mass of component (A) and component (B).

3. The adhesive silicone composition according to claim 1, wherein component (A) is represented by the following formula (1)

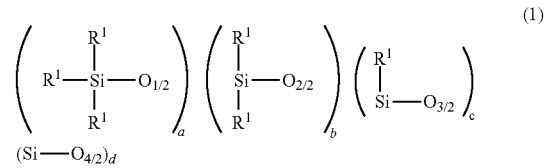

(1)

wherein $R^1$ is, independently of each other, a hydroxyl group or a substituted or unsubstituted, monovalent hydrocarbon group having 1 to 10 carbon atoms, provided that at least two $R^1$ are an alkenyl group-containing hydrocarbon group having 2 to 10 carbon atoms, a is an integer of 2 or more, b is an integer of 1 or more, c is an integer of 0 or more, d is an integer of 0 or more, and 100 a+b+c+d 20,000.

4. The adhesive silicone composition according to claim 1, wherein component (C) is represented by the following average compositional formula (2):

 (2)

wherein $R^3$ is, independently of each other, a hydroxyl group or a substituted or unsubstituted, monovalent hydrocarbon group having no aliphatic unsaturated bond, provided that $R^3$ is not an aryl group-containing organic group, e and f are a positive number, and e+f≤3.

5. The adhesive silicone composition according to claim 3, wherein component (A) is represented by the following formula (3) or (4)

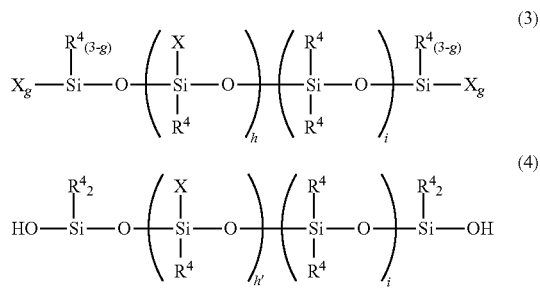

wherein $R^4$ is, independently of each other, a substituted or unsubstituted, monovalent hydrocarbon group having 1 to 10 carbon atoms and having no aliphatic unsaturated bond, X is an alkenyl group-containing hydrocarbon group having 2 to 10 carbon atoms, g is an integer of 0 to 3, h is an integer of 0 or more, h' is an integer of 2 or more, i is an integer of 100 or more, 2g+h ≥2, 102 h+i+2≤20,000, and 104 ≤h'+i+ 2≤20,000.

6. The adhesive silicone composition according to claim 1, wherein component (E)has an average degree of polymerization of 500 or less.

7. The adhesive silicone composition according to claim 6, wherein component (E) is represented by the following formula (5)

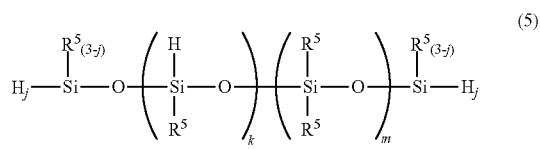

wherein $R^5$ is, independently of each other, a substituted or unsubstituted, monovalent hydrocarbon group having 1 to 10 carbon atoms and having no aliphatic unsaturated bond, provided that at least one $R^5$ is an aryl group-containing organic group having 6 to 10 carbon atoms, j is 0 or 1, k and m are an integer satisfying the following equations: 1≤k≤400, 0 ≤400, 3≤2j+k≤400, and 3 ≤k+m≤498.

8. The adhesive silicone composition according to claim 1, wherein in component (E), a ratio of the number of the aryl group-containing organic groups each bonded to a silicon atom to a total of the number of the hydrogen atoms each bonded to a silicon atom and the number of the groups each bonded to a silicon atom is 0.08 to 0.30.

9. The adhesive silicone composition according to claim 1, further comprising (G) an organo(poly)siloxane or other organic compound having at least two alkenyl groups in a molecule with an alkenyl group content of 0.15 to 2.5 mol/100g, in an amount of 0.01 to 10 parts by mass per total 100 parts by mass of component (A) and component (B).

10. The adhesive silicone composition according to claim 1, further comprising (H) an α-silyl aliphatic ester represented by the following formula (6) in an amount of 0.01 to 5 parts by mass per total 100 parts by mass of component (A) and component (B)

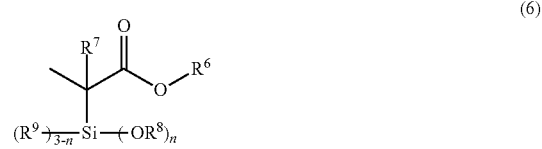

wherein $R^6$ is a monovalent hydrocarbon group having 1 to 20 carbon atoms, $R^7$ is a hydrogen atom or a methyl group, $R^8$ is, independently of each other, an unsubstituted or substituted alkyl group having 1 to 6 carbon atoms, $R^9$ is, independently of each other, an unsubstituted or substituted alkyl group having 1 to 6 carbon atoms, and n is an integer of 1 to 3.

11. A cured product obtained by curing the adhesive silicone composition according to claim 1.

12. An adhesive film or tape comprising a base material and an adhesive layer provided on at least one surface of the base material, wherein the adhesive layer is the cured product according to claim 11.

13. The adhesive film or tape according to claim 12, wherein the base material is a plastic film.

* * * * *

UNITED STATES PATENT AND TRADEMARK OFFICE
CERTIFICATE OF CORRECTION

| | | |
|---|---|---|
| PATENT NO. | : 11,702,574 B2 | Page 1 of 1 |
| APPLICATION NO. | : 16/961371 | |
| DATED | : July 18, 2023 | |
| INVENTOR(S) | : Ken Nakayama and Yasuyoshi Kuroda | |

It is certified that error appears in the above-identified patent and that said Letters Patent is hereby corrected as shown below:

In the Claims

Column 39, Claim No. 3, that portion of the formula reading
-100 a+b+c+d 20,000-

Should read --$100 \leqq a+b+c+d \leqq 20{,}000$--

Column 39, Claim No. 4, that portion of the formula reading
-$R^3{}_e H_f SiO_{(4-e-f)/2}$-
Should read --$R^3{}_e H_f SiO_{(4-e-f)/2}$--

Column 39, Claim No. 5, that portion of the formula reading
-2g+h $\geq$2, 102 h+i+2$\leq$20,000, and 104$\leq$h'+i+ 2$\leq$20,000-

Should read --$2g+h \geqq 2$, $102 \leqq h+i+2 \leqq 20{,}000$, and $104 \leqq h'+i+2 \leqq 20{,}000$--

Column 40, Claim No. 7, that portion of the formula reading
-$\leq$k$\leq$400, 0 $\leq$400, 3$\leq$2j+k$\leq$400, and 3 $\leq$k+m$\leq$498-

Should read --$\leqq k \leqq 400$, $0 \leqq m \leqq 400$, $3 \leqq 2j+k \leqq 400$, and $3 \leqq k+m \leqq 498$--

Signed and Sealed this
Seventh Day of November, 2023

*Katherine Kelly Vidal*
Katherine Kelly Vidal
*Director of the United States Patent and Trademark Office*